(12) United States Patent  (10) Patent No.: US 8,137,566 B2
Bozak et al.  (45) Date of Patent: Mar. 20, 2012

(54) RECOVERY OF TAILINGS PONDS

(75) Inventors: Wade Ralph Bozak, Edmonton (CA); Michael A. Kessick, Spruce Grove (CA); Roderick Michael Facey, Edmonton (CA)

(73) Assignee: RJ Oil Sands Inc., New Westminster (CA)

( * ) Notice: Subject to any disclaimer, the term of this patent is extended or adjusted under 35 U.S.C. 154(b) by 828 days.

(21) Appl. No.: 12/139,403

(22) Filed: Jun. 13, 2008

(65) Prior Publication Data
US 2009/0020458 A1  Jan. 22, 2009

(30) Foreign Application Priority Data

Jul. 16, 2007 (CA) .................................. 2594182

(51) Int. Cl.
*C02F 1/24* (2006.01)
*C02F 1/56* (2006.01)
(52) U.S. Cl. ........ 210/703; 208/391; 208/425; 210/708; 210/710; 210/712; 210/713; 210/727; 210/738; 210/747.9
(58) Field of Classification Search ............ 210/703
See application file for complete search history.

(56) References Cited

U.S. PATENT DOCUMENTS

| | | | | |
|---|---|---|---|---|
| 3,526,585 | A | * | 9/1970 | Camp ........................... 208/391 |
| 3,764,008 | A | | 10/1973 | Darley |
| 3,816,305 | A | * | 6/1974 | Schutte ........................ 210/702 |
| 3,925,189 | A | | 12/1975 | Wicks, III |
| 4,229,295 | A | | 10/1980 | Krofchak |
| 4,330,409 | A | * | 5/1982 | Yong et al. .................... 210/731 |
| 4,414,117 | A | * | 11/1983 | Yong et al. .................... 210/710 |
| 4,424,112 | A | | 1/1984 | Rendall |
| 4,444,277 | A | | 4/1984 | Lewis |
| 4,451,184 | A | | 5/1984 | Mitchell |
| 4,462,416 | A | | 7/1984 | George |
| 4,519,899 | A | | 5/1985 | Oertle |
| 4,822,481 | A | | 4/1989 | Taylor |
| 5,012,984 | A | | 5/1991 | Ishikawa |
| 5,460,270 | A | | 10/1995 | Chan |
| 5,811,013 | A | * | 9/1998 | Ito ................................ 210/705 |

(Continued)

FOREIGN PATENT DOCUMENTS
CA  1 164 383 A  3/1984
(Continued)

OTHER PUBLICATIONS

"Cavitation Sparging System: Enhanced Column Flotation," Canadian Process Technologies, Inc., Delta, Canada, 8-page brochure, published at least as early as Jul. 16, 2007.

(Continued)

*Primary Examiner* — Peter A Hruskoci
(74) *Attorney, Agent, or Firm* — Christensen O'Connor Johnson Kindness PLLC

(57) ABSTRACT

A method of treating tailings comprising a solids fraction and a hydrocarbon fraction is disclosed. A primary flow is supplied to a jet pump, the primary flow comprising water and less than 20% solids by mass. A secondary flow is supplied to a mixing chamber of the jet pump, the secondary flow comprising a slurry of water and tailings, the slurry comprising more solids by mass than the primary flow. The jet pump is operated using the primary flow such that the tailings are agitated to effect at least a partial phase separation of the hydrocarbon fraction from the tailings. The methods disclosed herein may also be applied to treat tailings ponds.

45 Claims, 7 Drawing Sheets

U.S. PATENT DOCUMENTS

| | | | |
|---|---|---|---|
| 5,879,541 | A | 3/1999 | Parkinson |
| 5,935,445 | A | 8/1999 | Febres |
| 5,935,447 | A | 8/1999 | Febres |
| 6,074,549 | A | 6/2000 | Bacon Cochrane |
| 6,527,960 | B1 * | 3/2003 | Bacon et al. .................. 210/741 |
| 7,416,671 | B2 * | 8/2008 | Bozak et al. .................. 210/708 |
| 7,727,384 | B2 * | 6/2010 | Strand .......................... 208/390 |
| 2006/0016760 | A1 * | 1/2006 | Bozak et al. .................. 210/708 |

FOREIGN PATENT DOCUMENTS

| | | | |
|---|---|---|---|
| CA | 2 174 801 | A1 | 10/1996 |
| CA | 2 159 514 | A1 | 3/1997 |
| CA | 2 229 970 | C | 11/1999 |
| CA | 2 101 240 | C | 12/1999 |
| CA | 2 306 069 | A1 | 4/2000 |
| CA | 2 319 566 | C | 4/2004 |
| CA | 2 515 581 | A1 | 7/2004 |
| CA | 2 420 034 | A1 | 8/2004 |
| CA | 2 453 697 | A1 | 6/2005 |
| CA | 2 510 099 | A1 | 1/2006 |
| CA | 2 512 324 | A1 | 1/2007 |
| CA | 2 531 007 | A1 | 6/2007 |
| CA | 2 636 135 | A1 | 7/2007 |
| CA | 2 651 440 | A1 | 11/2007 |
| CA | 2 651 767 | A1 | 11/2007 |
| DE | 43 12 725 | C1 | 3/1994 |

OTHER PUBLICATIONS

Hamza, H.A., et al., "Flocculation of Lime-Treated Oil Sands Tailings," Fuel 75(3):280-284, Feb. 1996.

"Jameson Cell—Principles of Operation," JamesonCell.com, © 2006 Xstrata Plc., Zug, Switzerland, <http://www.jamesoncell.com/index.cfm?action=dsp_content&contentID=16> [retrieved Mar. 7, 2011], published at least as early as Jul. 16, 2007, 3 pages.

Kasperski, K.L., "A Review of Properties and Treatment of Oil Sands Tailings," AOSTRA [Alberta Oil Sands Technology and Research] Journal of Research 8(1):11-42, Jan. 1992.

Kessick, M.A., "Clay Slimes From the Extraction of Alberta Oil Sands, Florida Phosphate Matrix and Other Mined Deposits," Canadian Mining and Metallurgical Bulletin, Feb. 1978, pp. 80-88.

Kessick, M.A., "Ion Exchange and Dewaterability of Clay Sludges," International Journal of Mineral Processing 6(4):277-283, Feb. 1980.

"Lobestar ® Mixing Eductor for Liquid and Slurry Applications," © 2003-2005 Vortex Ventures Inc., Houston, Texas, <http://www.vortexventures.com/Products/LobestarMixingEductors/LobestarMixingEducto . . . > [retrieved Sep. 21, 2005], 3 pages.

Schramm, L.L., et al., "Temperature Effects in the Conditioning and Flotation of Bitumen From Oil Sands in Terms of Oil Recovery and Physical Properties," Canadian International Petroleum Conference, Calgary, Canada, Jun. 11-13, 2002, Paper 2002-074, pp. 1-13.

St. Denis, C.E., and M.A. Kessick, "Recovery of Residual Bitumen From Oil Sand Sludges," Canadian Journal of Chemical Engineering 60(5):675-679, Oct. 1982.

International Search Report mailed Nov. 20, 2008 issued in corresponding International Application No. PCT/CA2008/001295, filed Jul. 16, 2008, 4 pages.

* cited by examiner

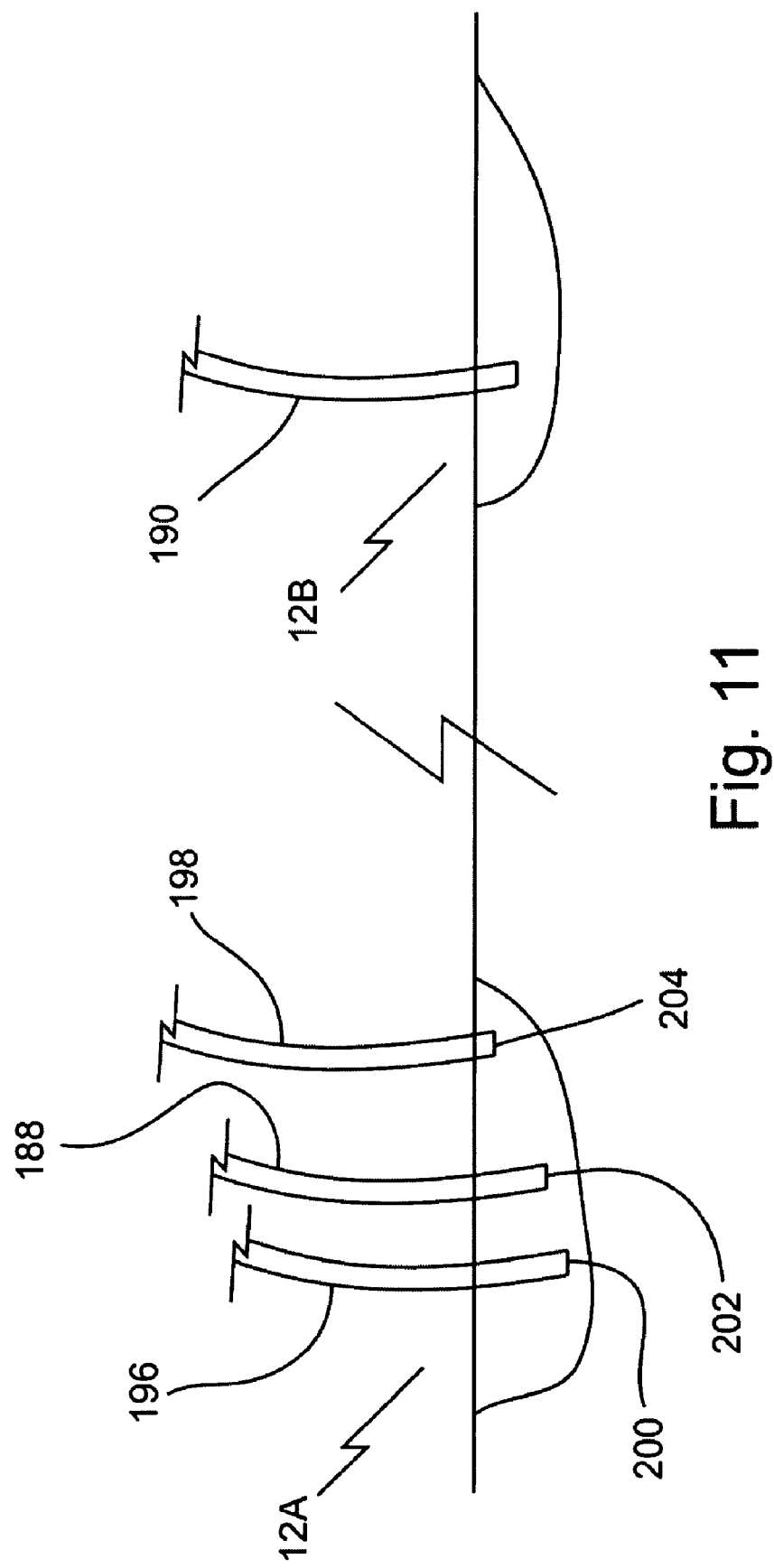

RECOVERY OF TAILINGS PONDS

BACKGROUND

Field

Treatment of tailings, for example tailings from tailings ponds resulting from oil sands production. In oil sands production, bitumen may be extracted from a mixture that is approximately 10% bitumen, 80% sand, and 10% fine tailings. The fine tailings are generally deposited in a tailings pond. However, fine tailings will not fully settle in these tailing ponds. It is believed that the electrostatic interactions between the suspended particles, which are still partly contaminated with hydrocarbons, prevent this from occurring. These tailing ponds have become an environmental liability for the companies responsible.

The oil sands tailings ponds constitute an unanticipated but persistent environmental and economic problem. They reflect process deficiencies in the bitumen extraction methods currently used. The problem has been mitigated by the industries to some degree, but there are several ponds that still present a major challenge for reclamation. Recent studies have been published that address the treatment of tailings as they are produced, in order to avoid the need for the large settling and storage areas.

SUMMARY

A method of treating tailings from a first tailings pond comprising a solids fraction, water, and a hydrocarbon fraction is disclosed. A primary flow is supplied to a jet pump, the primary flow comprising water. A secondary flow is supplied to a mixing chamber of the jet pump, the secondary flow comprising tailings. The jet pump is operated using the primary flow to produce agitated tailings and to effect at least a partial separation of the hydrocarbon fraction from the tailings.

A method of recovering a tailings pond is also disclosed. Tailings from a tailings pond are supplied to a mixing chamber of a jet pump, the tailings having at least a hydrocarbon fraction and a solids fraction. A primary flow is supplied to the jet pump. A flow of gas is supplied to the mixing chamber of the jet pump. The jet pump is operated using the primary flow to agitate the tailings and flow of gas to effect at least a partial phase separation of the hydrocarbon fraction from the solids fraction. At least a portion of the hydrocarbon fraction is separated from the tailings in at least one separator. The tailings are flocculated to give flocculated tailings, and the flocculated tailings are dewatered.

A method of recovering a tailings pond is also disclosed. Tailings are supplied from the tailings pond to a mixing chamber of a jet pump, the tailings having a hydrocarbon fraction and a solids fraction. A primary flow is supplied to the jet pump. The jet pump is operated using the primary flow such that the tailings are agitated to effect at least a partial phase separation of the hydrocarbon fraction from the solids fraction. At least a portion of the hydrocarbon fraction is separated from the tailings in at least one separator. The tailings are dewatered.

A method for phase separation of a mixture having at least a solids fraction and a hydrocarbon fraction is also disclosed. The mixture is supplied to a mixing chamber of a jet pump. A primary flow is supplied to an input of the jet pump. A flow of gas is supplied to the mixing chamber of the jet pump. The jet pump is operated using the primary flow and controlling the flow of gas to agitate the mixture and gas and supply an agitated mixture into a separator to effect at least a partial phase separation of the hydrocarbon fraction from the solids fraction and to create effervescence in the separator.

A method is also disclosed for washing a hydrocarbon fraction supplied from a first separator. The hydrocarbon fraction is supplied into a jet pump. A flow of gas is supplied to a mixing chamber of the jet pump. The jet pump is operated using the hydrocarbon fraction and the flow of gas to agitate the hydrocarbon fraction and supply an agitated hydrocarbon fraction from the jet pump into a second separator to effect at least a partial phase separation of the hydrocarbon fraction from the solids fraction. In some embodiments, the hydrocarbon fraction is hydrocarbon froth.

A method is also disclosed of separating hydrocarbons from a mixture comprising a hydrocarbon fraction, a solids fraction, and a water fraction. At least a portion of the mixture is supplied as a primary flow into a jet pump. A flow of gas is supplied to a mixing chamber of the jet pump. The jet pump is operated using the at least a portion of the mixture and the flow of gas to agitate the at least a portion of the mixture and supply an agitated mixture from the jet pump into a separator to effect at least a partial phase separation of the hydrocarbon fraction from the solids fraction.

A method is also disclosed of treating a mixture comprising tailings, the tailings being at least partially separated from the mixture in a separator. At least a portion of the tailings are supplied from the mixture in the separator. A flocculant is added to the tailings to create flocculated tailings, and the flocculated tailings are dewatered.

A method of recovering at least one tailings ponds is also disclosed. Tailings are supplied from a first tailings pond, the tailings comprising a solids fraction, a hydrocarbon fraction, and a water fraction. At least a portion of the water fraction is separated from the hydrocarbon fraction and the solids fraction. The at least a portion of the water fraction is returned to a second tailings pond different from the first tailings pond.

A method of recovering a tailings pond is also disclosed. Tailings are supplied from a tailings pond, the tailings comprising a solids fraction, a hydrocarbon fraction, and a water fraction. At least a portion of the water fraction is separated from the hydrocarbon fraction and the solids fraction using at least a jet pump. The at least a portion of the water fraction is returned to the tailings pond.

A method of recovering a tailings pond is also disclosed. Tailings are supplied from a tailings pond, the tailings comprising a solids fraction, a hydrocarbon fraction, and a water fraction. At least a portion of the solids fraction is separated from the hydrocarbon fraction and the water fraction. The at least a portion of the solids fraction is returned to the tailings pond.

A method of recovering a series of tailings ponds is also disclosed. Tailings are supplied from a first tailings pond, the tailings comprising a solids fraction, a hydrocarbon fraction, and a water fraction. The solids fraction is separated from the hydrocarbon fraction and the water fraction. The solids fraction is returned to a second tailings pond different from the first tailings pond.

A method is disclosed for at least partial phase separation of a mixture comprising tailings, the mixture having at least a solids fraction and a hydrocarbon fraction. The mixture is diluted with a diluent to give a diluted mixture. The diluted mixture is supplied to a mixing chamber of a jet pump. A primary flow is supplied to an input of the jet pump. The jet pump is operated using the primary flow to agitate the diluted mixture and supply an agitated mixture from the jet pump to effect at least a partial phase separation of the hydrocarbon fraction from the solids fraction.

A method of recovering at least one tailings pond is also disclosed. A material having a first density from the at least one tailings pond is supplied to a mixing chamber of a jet pump, the material having a hydrocarbon fraction and a solids fraction. A primary flow having a second density from the at least one tailings pond is supplied to the jet pump, the second density being different than the first density. The jet pump is operated using the primary flow to agitate the material and supply agitated material from the jet pump to effect at least a partial phase separation of the hydrocarbon fraction from the solids fraction. In some embodiments, the second density is lower than the first density.

A method of recovering at least one tailings pond is also disclosed. A material having a first liquid content from the at least one tailings pond is supplied to a mixing chamber of a jet pump, the material having a hydrocarbon fraction and a solids fraction. A primary flow having a second liquid content is supplied to the jet pump, the second liquid content being different than the first liquid content. The jet pump is operated using the primary flow to agitate the material and supply agitated material from the jet pump to effect at least a partial phase separation of the hydrocarbon fraction from the solids fraction. In some embodiments, the second liquid content is higher than the first liquid content.

A method of recovering a tailings pond is also disclosed. A first material from a first vertical level of the tailings pond is supplied to a mixing chamber of a jet pump, the material having a hydrocarbon fraction and a solids fraction. A second material from a second vertical level of the tailings pond is supplied as a primary flow to the jet pump, the second vertical level being different than the first vertical level. The jet pump is operated using the second material to agitate the first material and supply the agitated material from the jet pump to effect at least a partial phase separation of the hydrocarbon fraction from the solids fraction. In some embodiments, the second vertical level is higher than the first vertical level.

There is also provided a process for phase separation of a mixture having a solids fraction and a hydrocarbon fraction. The process comprises the steps of: supplying the mixture to a mixing chamber of a jet pump; supplying a primary flow, such as water from a tailings pond containing less than 20% suspended tailings by volume, to an input of a jet pump; supplying air to the mixing chamber of the jet pump from a source distinct from the mixture and the primary flow; and operating the jet pump using the primary flow to agitate the mixture and air and supply the agitated mixture from the jet pump to effect at least a partial phase separation of the hydrocarbon fraction from the solids fraction.

The mixture may be supplied to a separator to separate at least a portion of the hydrocarbon fraction from the solids fraction in the separator. Separating at least a portion of the hydrocarbon fraction from the solids fraction in the separator may comprise settling the solids fraction to a bottom of a settling tank; and removing the hydrocarbon fraction from a top of the settling tank. The solids that settle to the bottom of the settling tank may be supplied to a mixing chamber of an auxiliary jet pump. Removing the hydrocarbon fraction from the top of the settling tank may comprise pumping a hydrocarbon froth from the top of the settling tank.

The mixture supplied to the mixing chamber may be a slurry comprising the solids fraction, the hydrocarbon fraction, and a water fraction. The slurry may be water from a tailings pond, the solids fraction comprising between 20% and 50% suspended tailings by volume. The mixture may be at least one of invert drill cuttings, oil sands, and tailings. The mixture may comprise solids containing entrained air.

The air may be supplied by causing the jet pump to draw air into the mixing chamber or by supplying air through a controlled air source. The volume of supplied air and the volume of the solids fraction may be substantially equal.

There is also provided a method of treating tailings comprising a solids fraction and a hydrocarbon fraction. The method comprises the steps of supplying a primary flow to a jet pump, the primary flow comprising less than 20% suspended solids by mass; supplying a secondary flow to a mixing chamber of a jet pump, the secondary flow comprising a slurry of water and tailings from the tailings pond, the slurry comprising between 20% and 50% solids by mass; and operating the jet pump using the primary flow such that the tailings are agitated to effect at least a partial phase separation of the hydrocarbon fraction from the tailings.

A method is also disclosed for treating tailings comprising at least a solids fraction and a hydrocarbon fraction. A primary flow is supplied to a jet pump, the primary flow comprising water. A secondary flow is supplied to a mixing chamber of the jet pump, the secondary flow comprising tailings, the secondary flow comprising more solids by mass than the primary flow. The jet pump is operated using the primary flow to produce agitated tailings and to effect at least a partial separation of the hydrocarbon fraction from the agitated tailings.

The method may further comprise the steps of: supplying the tailings to a separator; and separating at least a portion of the hydrocarbon fraction from the tailings in the separator. Separating at least a portion of the hydrocarbon fraction from the tailings in the separator may comprise: settling the tailings to a bottom of a settling tank; and removing the hydrocarbon fraction from a top of the settling tank. The tailings that settle to the bottom of the settling tank may be supplied to a mixing chamber of an auxiliary jet pump for additional separation. Removing the hydrocarbon fraction from the top of the settling tank may comprise removing a hydrocarbon froth from the top of the settling tank.

At least one of the primary flow and the secondary flow may be supplied from a tailings pond. Air may be supplied to the mixing chamber of the jet pump from a source distinct from the primary flow and the secondary flow, such as by causing the jet pump to draw air into the mixing chamber, or by supplying air through a controlled air source. The volume of supplied air and the volume of tailings may be substantially equal.

There is also provided a method of treating a substance with a jet pump. The method comprises the steps of: supplying a primary stream of fluid to the jet pump; supplying a secondary stream of fluid to a mixing chamber of the jet pump; supplying air to the mixing chamber of the jet pump from a source distinct from the primary stream and the secondary stream of fluid; and operating the jet pump using the primary stream to discharge a mixture of the primary stream, the secondary and the air from the jet pump. The secondary stream may comprise at least one of tailings, drill cuttings, tar sands, sewage, pulp effluent.

There is also provided a method of recovering a tailings pond. The method comprises the steps of: supplying tailings from the tailings pond to a mixing chamber of a jet pump, the tailings having a hydrocarbon fraction and a solids fraction; supplying a primary flow to the jet pump; operating the jet pump using the primary flow such that the tailings are agitated to effect at least a partial separation of the hydrocarbon fraction from the solids fraction; separating at least a portion of the hydrocarbon fraction from the tailings in at least one separator; dewatering the tailings.

Air may be supplied to the mixing chamber of the jet pump from a source distinct from the tailings and the primary flow, and the jet pump may be operated using the primary flow to agitate the tailings to effect at least a partial phase separation hydrocarbon fraction from the solids fraction. Separating at least a portion of the hydrocarbon fraction from the tailings in a separator may comprise comprises supplying the tailings in the separator to an auxiliary jet pump. Supplying a primary flow may comprise supplying water from the tailings pond comprising less than 20% solids by mass. Supplying tailings from the tailings pond may comprise supplying a slurry comprising between 20% and 50% solids by mass from the tailings pond.

Dewatering the tailings may comprise adding a flocculant, such as an anionic long chain polymer, to flocculate the tailings, and dewatering the flocculated tailings. The dewatered tailings may then be returned to the tailings pond.

BRIEF DESCRIPTION OF THE DRAWINGS

Exemplary embodiments are now described in detail with reference to the drawings, in which:

FIG. 11 is a side elevation view of two tailings ponds.

DETAILED DESCRIPTION OF THE DRAWINGS

Figure 1:
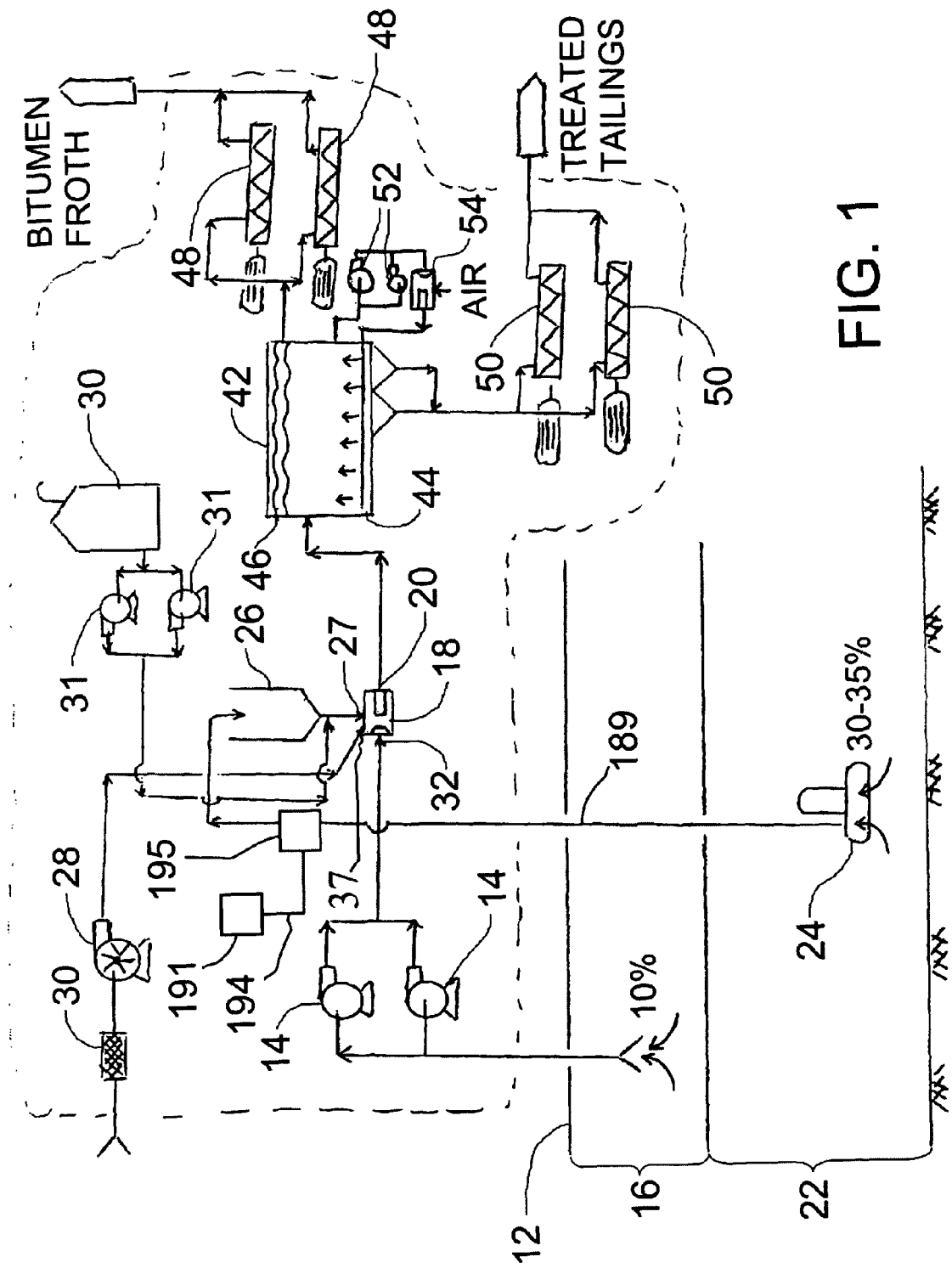
FIG. 1 is a flow chart of a process for the treatment of an oil sands tailings pond.

With reference to FIG. 1, an overview of a process for the separation and recovery of hydrocarbons from tailings is shown. Tailings may contain primarily both hydrocarbons and solids, for example mineral material, such as rock, sand, silt and clay. Because of the hydrocarbon contamination of the tailings stored in tailings ponds, the process below is particularly useful in reclaiming these ponds by removing the contamination, and using the decontaminated tailings to return land to its natural state.

Figure 3:
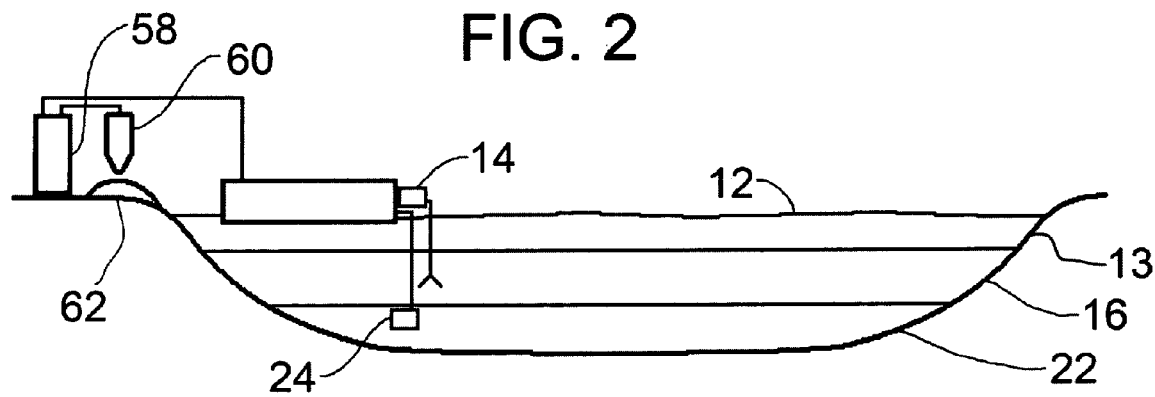
FIG. 3 is a side view in section of a cell used to dispose of treated tailings partially filled with tailings.

Referring to FIG. 3, a tailings pond 12 may comprise three main layers. The top layer 13 may be, for example, a clear water layer that is maintained largely to prevent wind action from disrupting the settling regime at the lower depths. An intermediate layer 16 may contain, for example, dispersed fine clays and colloidal organic material at around one percent by mass. These are settling slowly into the bottom layer 22 (also referred to as the settled solids zone) that may, for example, consist of mature fine tailings (MFT). Layer 22 may be, for example, thixotropic. Layer 22's structure may prevent any natural consolidation beyond about forty percent solids by mass. The layer 22 also contains residual bitumen of, for example, several percent by mass, the amount being largely dependent on the extraction process that is the source of the tailings. This layer 22 may also hold a high percentage of water that may be unrecoverable by conventional methods. In some embodiments, pond 12 may not have any distinct layers.

The residual bitumen in the MFT is considered to severely limit its hydraulic conductivity and thus contribute to its structure. Recovery of this bitumen may provide an economic benefit that could defray the cost even of mechanical dewatering procedures such as, for example, centrifugation. A significant variable may be dilution, with a dilution rate of ½ MFT/water allowing for greater than 90% recovery at ambient temperatures over a period of one hour, for example.

Figure 2:
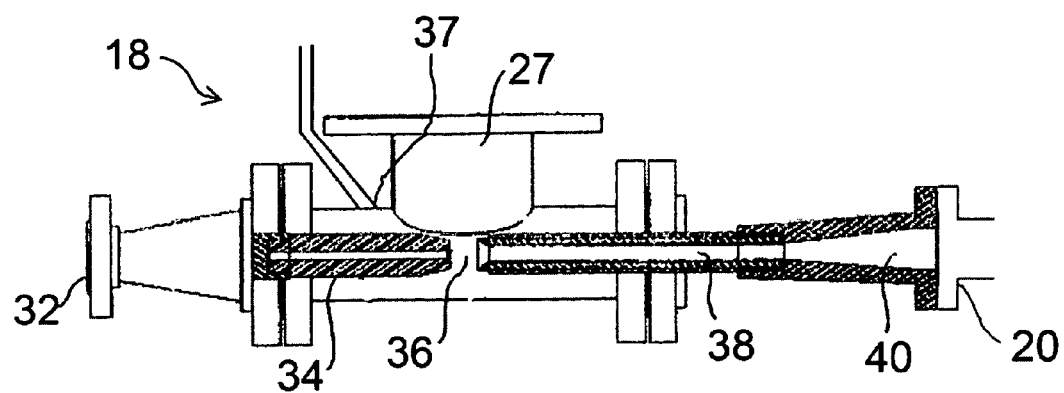
FIG. 2 is a detailed schematic of a jet pump for use in the process of FIG. 1.

Referring to FIG. 2, a jet pump 18, which may be used in any of the methods disclosed herein, is illustrated, the jet pump 18 having a mixing chamber 38. In some embodiments, a primary flow may be supplied to jet pump 18. In other embodiments, a primary flow and a secondary flow may be supplied to jet pump 18. In other embodiments, other fluids or materials may be provided to jet pump 18 instead of, or in addition to, the primary flow and/or secondary flow. The primary flow may be supplied to an input of jet pump 18, for example, nozzle 34. The secondary flow may be supplied via an inlet 27. The primary flow may comprise, for example, water and less than 20% solids by mass. In some embodiments, the primary flow comprises water from the tailings pond. In some embodiments, tailings are supplied to the mixing chamber 38 from the tailings pond 12, the tailings comprising a slurry comprising solids from the tailings pond. In further embodiments, the slurry comprises more solids by mass than the primary flow. Tailings, in this document, may include at least one of heavy mature fine tailings, mature fine tailings, and light mature fine tailings. In some embodiments, tailings may refer other types of tailings. In some embodiments, tailings may refer to a fluid or material that contains tailings. In some embodiments, the primary flow may comprise tailings. In further embodiments, the primary flow may comprise, for example, light mature fine tailings.

In some embodiments, a diluent may be added to any of the materials supplied to the jet pump. In some embodiments, the diluent may comprise a non-polar solvent for example. The diluent may be added to any the tailings prior to supply into the jet pump, in order to decrease the amount of processing required to separate the hydrocarbon fraction from the tailings.

Reference to a separator in this document may refer to, for example, a settling tank. Referring to FIG. 1, the settling tank may be, for example, a flotation cell 42. In some embodiments, the separator may be other devices, such as a centrifuge, and a settling tank. In some embodiments, the centrifuge is a decanter. In other embodiments, the separator may be a filtration device.

In some embodiments of the methods disclosed herein, a mixture may be used. The mixture may comprise, for example, a hydrocarbon fraction, and a solids fraction. In other embodiments, the mixture may comprise, for example, a hydrocarbon fraction, and a solids fraction, and a water fraction. The mixture may comprise tailings, and at least the mixture may be from a tailings pond 12. In addition, the mixture may comprise water. The primary flow may comprise tailings, the primary flow having a higher liquid content than the mixture.

Referring to FIG. 2, in one embodiment of a method of treating tailings from a first tailings pond comprising a solids fraction, water, and a hydrocarbon fraction, a primary flow is supplied to jet pump 18, the primary flow comprising water.

The primary flow may further comprise less than 20% solids by mass. In other embodiments, the primary flow may have more than or equal to 20% solids by mass. A secondary flow is supplied to mixing chamber 38 of the jet pump 18, through for example inlet 27. At least one of the primary flow and the secondary flow may be supplied from tailings pond 12. Referring to FIG. 1, the secondary flow comprises tailings. In some embodiments, the secondary flow may comprise a slurry, for example a slurry of water and tailings. The tailings may be, for example, from tailings pond 12, the slurry comprising more solids by mass than the primary flow. In some embodiments, the secondary flow comprises between 20% and 50% solids by mass. Jet pump 18 is operated using the primary flow such to produce agitated tailings and to effect at least a partial separation of the hydrocarbon fraction from the agitated tailings. The mixture of the primary flow, the secondary flow, and any gas introduced may be characterized as agitated tailings. Referring to FIG. 2, jet pump 18 may supply the agitated tailings into a diffusor 40 leading to a discharge line 20, for example. In some embodiments, the agitated tailings is propelled from the jet pump 18.

Referring to FIG. 2, in some embodiments, a flow of gas may be supplied to the mixing chamber 38 of the jet pump 18. The flow of gas may be supplied by, for example, a gas supply inlet 37. As in all embodiments, the gas may comprise air. In other embodiments, the gas may comprise, for example, $CO_2$. Mixtures of gases may also be supplied. Supplying the gas may comprise causing the jet pump 18 to draw the gas into the mixing chamber 38. This may be accomplished by opening gas supply inlet 37 to the atmosphere. Referring to FIG. 1, in other embodiments the supply of gas may be controlled. In these embodiments, operating the jet pump may further comprise controlling the flow of gas. This may be accomplished, for example, using a valve mechanism (not shown). Referring to FIG. 1, the agitated tailings may then be supplied into at least one separator (illustrated by floatation cell 42, for example) to create effervescence in the at least one separator. Effervescence may refer to the fact that at least a portion of the gas introduced into the agitated mixture bubbles out of solution in the separator. This effervescence may give the mixture in the separator a champagne-like appearance. In some embodiments, gas may be metered until the top of the settling tank looks like champagne. In these embodiments, at least the mixture may be from a tailings pond 12. In addition, the mixture may comprise water. The volume of supplied gas and the volume of tailings may be substantially equal.

In some embodiments, the flow of gas is from a source distinct from other flows or material introduced into the mixing chamber 38 of the jet pump 18. In a further embodiment, the flow of gas is from a source distinct from a mixture, or secondary flow, and the primary flow. In some embodiments, the supply of gas may be controlled to create effervescence in a separator into which the materials pumped through the jet pump are supplied into.

Figure 5:
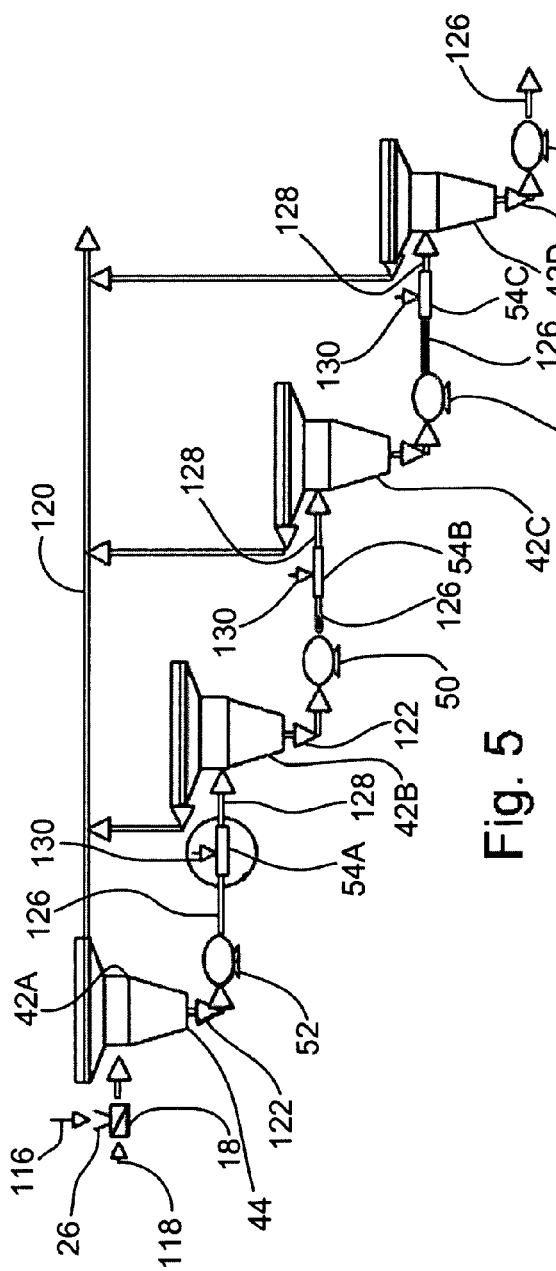
FIG. 5 is a flow schematic of an embodiment of a froth recovery process.

Referring to FIG. 1, jet pump 18 may further supply the agitated tailings into at least one separator, such as a floatation cell 42. The separator may be, for example, at least one of a centrifuge, and a settling tank. The centrifuge may be a decanter. In the separator, at least a portion of the hydrocarbon fraction may be separated from the agitated tailings. Separating at least a portion of the hydrocarbon fraction from the agitated tailings in the separator (illustrated as floatation cell 42) may comprise, for example, removing the at least a portion of the hydrocarbon fraction from an upper portion 46. The upper portion 46 refers to the upper portion of fluid settled in the separator. Removing may comprise, for example, removing the at least a portion of the hydrocarbon fraction. Referring to FIG. 5, removing may also comprise removing a hydrocarbon froth, for example from floatation cell 42A through line 120. In the embodiment of FIG. 5, described in greater detail below, the agitated tailings are supplied into floatation cell 42A after processing in jet pump 18. Referring to FIG. 1, removal of the hydrocarbon fraction from the upper portion 46 of the settling tank may comprise removing a hydrocarbon froth from upper portion 46.

Figure 6:
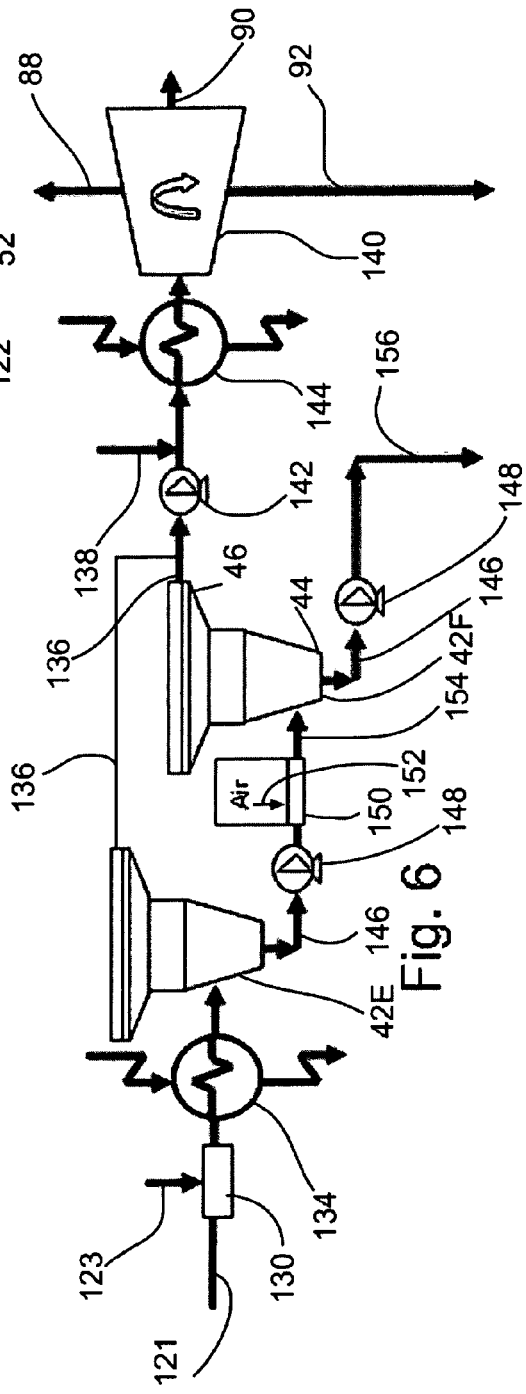
FIG. 6 is a flow schematic of an embodiment of a froth washing process.

Referring to FIGS. 5 and 6, the at least a portion of the hydrocarbon fraction from line 120 (shown in FIG. 5), for example, may then be supplied into a second jet pump (illustrated as jet pump 130) through for example line 121. A flow of gas is supplied to a mixing chamber of the second jet pump 130, through line 123, for example. The second jet pump 130 is then operated using the hydrocarbon fraction and the flow of gas to agitate the hydrocarbon fraction and supply an agitated hydrocarbon fraction from the second jet pump 130 into a second separator (illustrated as floatation cell 42E, for example) to effect at least a partial phase separation of the hydrocarbon fraction from the solids fraction. This process is explained in greater detail below, and may have many variations.

Referring to FIG. 6, the flow schematic illustrates a method for washing a hydrocarbon fraction removed from a first separator. The first separator may be, for example, flotation cell 42 shown in FIG. 1. As described above, the hydrocarbon fraction, which may be hydrocarbon froth, removed from the first separator may be supplied into a jet pump 130, via line 121 for example. The flow of gas is supplied to a mixing chamber of the jet pump 130, via line 123 for example. In this way, the hydrocarbon froth may be supplied as a primary flow to jet pump 130. In the embodiment illustrated in FIG. 6, the second separator may be, for example, flotation cell 42E. In some embodiments, the flow of gas may be the primary flow. In other embodiments, the hydrocarbon froth may be supplied via line 123 into jet pump 130, and a primary flow may be supplied to the jet pump 130 to agitate the hydrocarbon froth and the flow of gas. The primary flow may be supplied to jet pump 130 via line 121, with the flow of gas being supplied by a separate line (not illustrated), if the flow of gas is not the primary flow. The primary flow in these embodiments may be, for example, water, or tailings. In other embodiments, the primary flow may comprise, for example, a diluent.

In other embodiments, a diluent may be added at some point in the process. The diluent may be added to at least one of the primary flow, the hydrocarbon froth, and the agitated hydrocarbon froth. Diluent may be added into the system via line 138, for example. In some embodiments, diluent may be added prior to supplying the agitated hydrocarbon froth into the second separator. The addition of a diluent and further dilbit processing illustrated in FIG. 6 is described in greater detail later in this document. Referring to FIG. 6, the steps may be repeated using hydrocarbon froth supplied from the second separator (illustrated as floatation cell 42E), for example by treating the hydrocarbon froth in a jet pump 142. In other embodiments, pump 142 may be a type of pump other than a jet pump. In other embodiments, the second separator may be the first separator, and the hydrocarbon froth recirculated. Recirculation is illustrated in the embodiment of FIG. 1, where the water is recirculated using auxiliary jet pumps 54. In the recirculation embodiments of the hydrocarbon froth, the hydrocarbon froth is recirculated into the same separator in order to further process the froth.

Referring to FIG. 6, the operating step may comprise heating, such as for example heating the jet pump 130, or heating any one of the flows into jet pump 130. In other embodiments, the agitated hydrocarbon froth may be heated. This is illustrated by the use of heat exchanger 134. Heat exchangers may be used in order to raise the temperature of any of the flows in the system. In some embodiments, at least one of the separators may be heated.

In some embodiments, the methods may further comprise the step of separating at least a portion of the solids fraction from the agitated tailings in the at least one separator. Separating at least a portion of the solids fraction may comprise, for example, removing the at least a portion of the solids fraction from a bottom portion 44 of the flotation cell 42. Bottom portion 44 (illustrated in FIG. 6 on floatation cell 42E) refers to the bottom settled portion of the fluid in the separator, and may include a lower portion (not shown).

Figure 8:
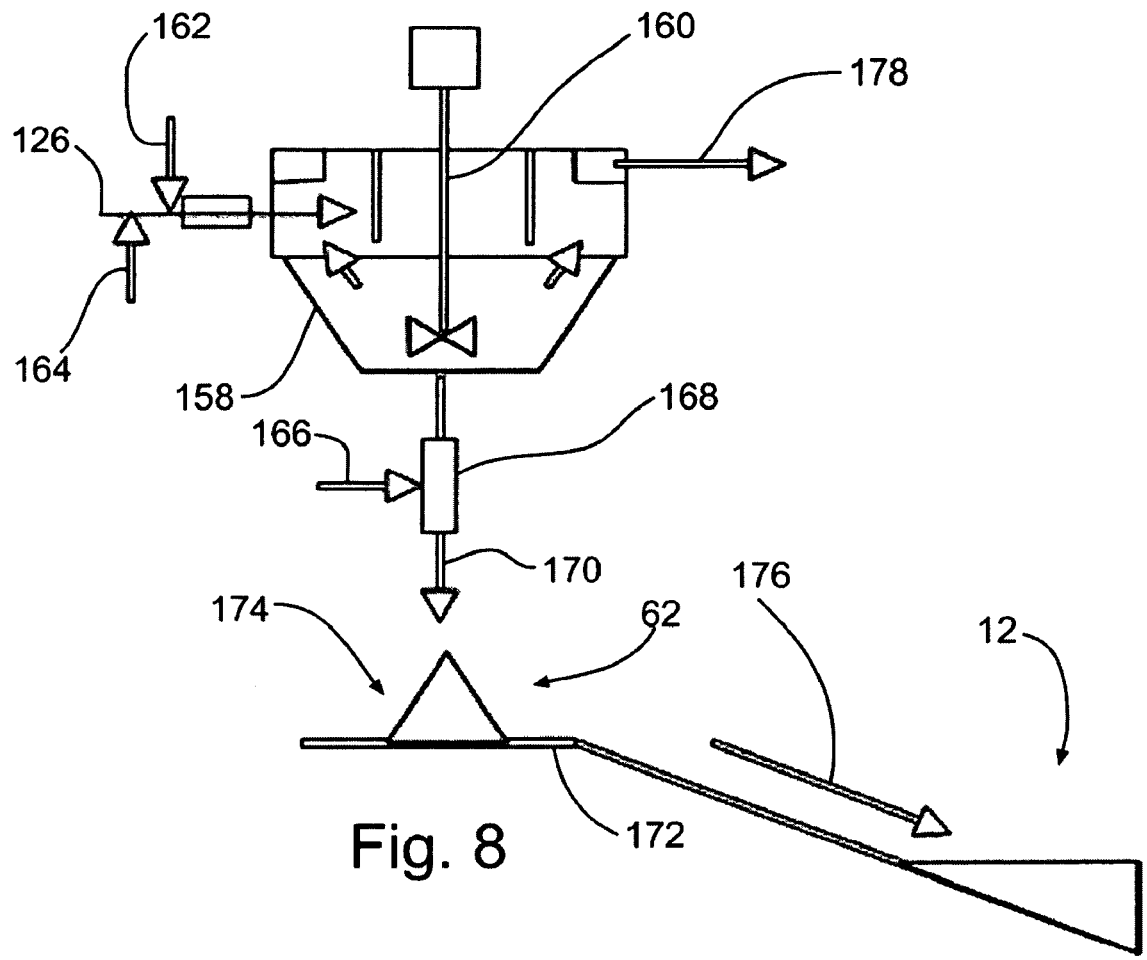
FIG. 8 is a flow schematic of an embodiment of a process for flocculation and dewatering.

Solids consolidation may consist of, for example, two procedures: flocculation and dewatering. After removal of the residual bitumen from the MFT, polymer may be used to consolidate the remaining material to a stackable solid. In some embodiments, the at least a portion of the solids fraction separated from the agitated tailings may be flocculated to give flocculated solids. In further embodiments, the flocculated solids are dewatered. Referring to FIG. 8, a schematic for a method of flocculating and dewatering solids is illustrated. The solids may be, for example, processed tailings. Processed tailings refer to tailings that have been processed to any degree using the systems and methods disclosed herein. In the embodiment illustrated in FIG. 8, the solids fraction may have been removed from the lower portion of one of floatation cell 42F (shown in FIG. 6) for example. The methods of flocculating and dewatering may be used with any of the embodiments disclosed herein. A flocculant is added to the solids fraction, to create flocculated solids. The flocculant may be added via line 162, for example, into line 126 containing the solids fraction. The flocculant and solids fraction may then be deposited in a tank 158. In some embodiments, the flocculant may be added directly to the solids fraction contained in the tank 158. The flocculant may comprise, for example, a long-chain anionic polymer, for further example a 50 million MW polymer. In some embodiments, the flocculant may comprise a polyacrylamide-type flocculant. Water may be added to the solids fraction via line 164 for example. The flocculant and dilution water may be added to line 126 via lines 162 and 164, respectively. The water may be added prior to adding the flocculant, for example. In some embodiments, after the residual bitumen has been removed (as hydrocarbon froth, for example), effective flocculation may be achieved by further dilution of the solids fraction, for example cleaned mature fine tailings (CMFT), with water via line 164, in a suitable ratio, for example about 1:1 with water, for example pond water, and addition of a suitable flocculant such as polyacrylamide-type flocculant in a stirred tank 158 (shown in FIG. 8 for example). The solids fraction may be introduced into line 126 via the final line 156 in FIG. 6, for example.

Figure 9:
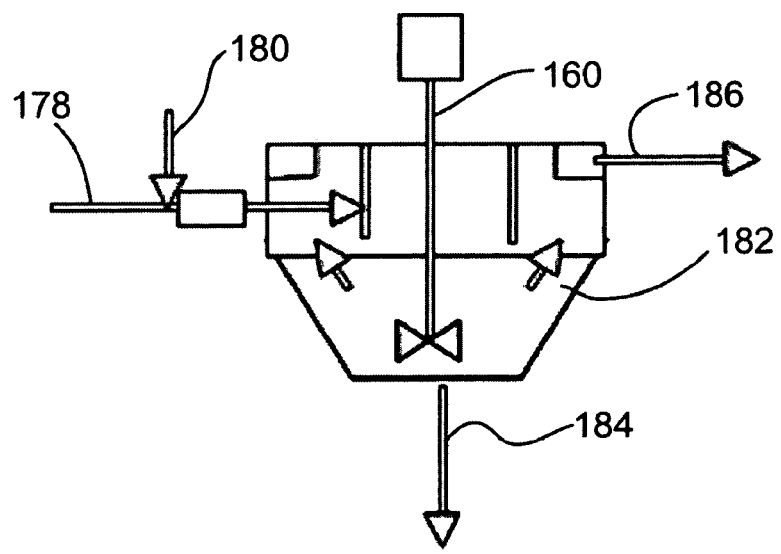
FIG. 9 is a flow schematic of an embodiment of a process for water clarification.

The flocculated solids may then be mechanically broken down. After, for example, an initial period of rapid mixing followed by slow stirring, flocs form and settle to a compact sludge. Referring to FIGS. 8 and 9, this flocculation and settling may be carried out in a thickener/clarifier, such as tanks 158 or 182. The settled sludge may be fragile and drains slowly. The constituent flocs can be broken down or agitated by mechanical action, such as passage through a pump (not shown), or using a stirring device 160. This may be accomplished in tank 158, for example, by stirring device 160. The flocculated solids may be settled, for example in tank 158, and the supernatant removed from the flocculated solids. This may be done by removing the water overlying the flocculated solids, for example. The supernatant may be removed via line 178. The supernatant may then be further treated, for example by adding a flocculant to the supernatant to create flocculated supernatant, and dewatering the flocculated supernatant according to the methods disclosed herein for flocculating and dewatering the solids fraction, for example.

In some embodiments, a flocculant may be added to the flocculated tailings. This may take the form of additional flocculant added to the flocculated solids in, for example, tank 158, or via line 166 into line 170 containing flocculated solids. Further addition of polymer to the settled sludge, even after mechanical disruption, may result in the formation of massive robust flocs that drain rapidly. This further addition can be applied typically in an in-line mixer 168 after passage through a pump (not shown) and during pipeline transport to a disposal area 172 (shown in FIG. 8). This is illustrated through the addition of coagulant via line 166 into the materials removed from tank 158. Process water may be removed from tank 158 via line 178 and processed in water treatment step 92 (shown in FIG. 7).

Figure 7:
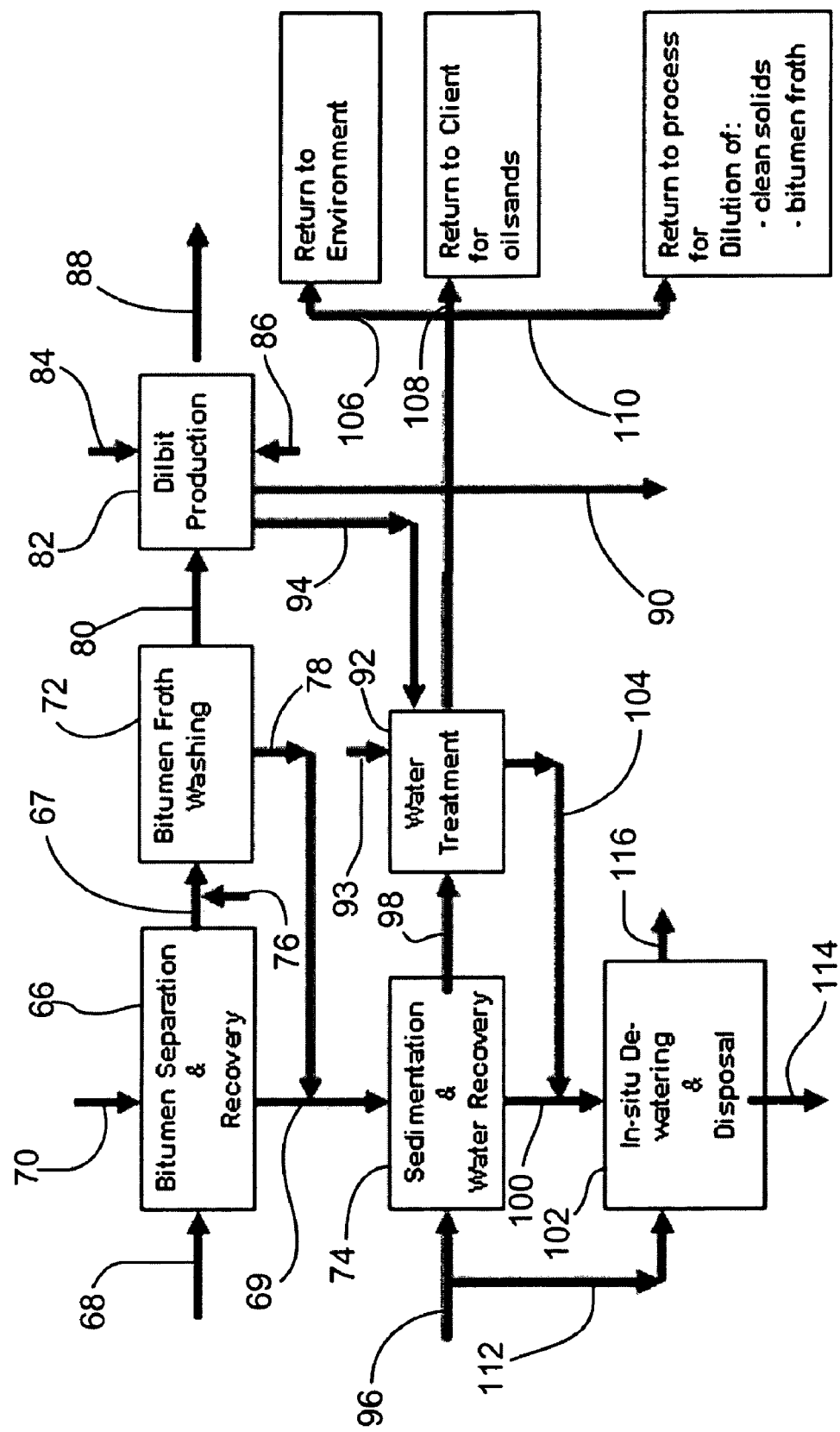
FIG. 7 is a flow chart of an embodiment of an overall process for the treatment of an oil sands tailings pond.

Referring to FIG. 8, dewatering may comprise allowing the flocculated solids to drain, for example down berm 62 into tailings pond 12. Referring to FIG. 7, the rapidly draining robust flocs may then be deposited at a drainage/disposal area, such as a gently sloping sand berm 62, in such a manner as to promote draining. The solids deposited on drainage area 172 may have, for example, a solids concentration of greater than or equal to 45%. The draining can be aided by devices such as rakes, such as from a backhoe (not shown) which open channels to allow the freed water to run off. The flocs continue to dewater under the action of the polymer, and this combined with evaporation results in a consolidated, trafficable substrate, such as for example a stackable solid, after a period of, for example, two to three weeks. The path of the free draining water is illustrated by arrow 176. The consolidated cleaned tailings may then be pushed back into pond 12, displacing the untreated MFT that is being pumped out and processed.

The solids treated under the methods described herein may also be processed to extract mineral content, in the same way as minable solids. This has advantages, as the treated tailings may comprise a high mineral or metal content, containing metals, such as titanium for example, in high concentration.

Referring to FIG. 9, an exemplary schematic illustrating a water clarification step, such as that carried out in step 92 (shown in FIG. 7) is detailed. For example, the supernatant from line 178 from the flocculation step (illustrated in FIG. 7) may be invariably turbid due to the presence of very fine solids and colloidal matter. Clarification may be achieved, however, by water treatment procedures. The addition of low amounts of coagulant (alum), followed by very low dosages of polymer via line 180, results in the formation of massive flocs that settle rapidly in mixing tank 182. Like tank 158, tank 182 may have a stirring device 160. The sediment removed from tank 182 via line 184 may be combined with the sediment from the main flocculation stage (shown in FIG. 8) for consolidation and dewatering. The sediment may be, for example, a solids slurry. The clarified supernatant removed via line 186 may have, for example, a turbidity typically around 10 NTU or less. The supernatant water may then be re-used in the process, for example.

Figure 4:
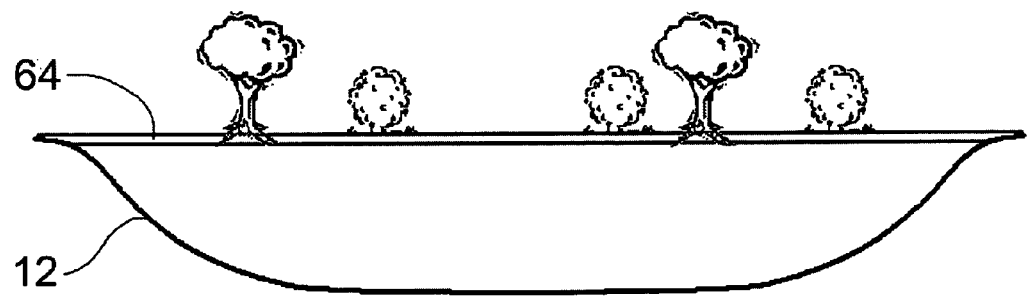
FIG. 4 is a side view in section of the cell of FIG. 3 with the land recovered.

Referring to FIG. 3, in the depicted example, the solid consolidation steps may be done by transferring the treated tailings to a flash mixer 58 to be mixed with a flocculent, such as polyacrylamide-type flocculant, an anionic or cationic long chain polymer, or other suitable chemicals that will be known to those in the art. Since clay is predominantly negatively charged at neutral pH, when anionic flocculants are used, cations, such as lime or calcium, may be added to sufficiently make the solution. It has been found that the positive ions in municipally treated water may be sufficient for anionic long chain polymers to cause a clay mixture to flocculate. Thus, it is sufficient to dilute the anionic long chain polymers with the municipally treated water prior to adding it to the slurry. The slurry is then separated by dewatering the tailings. This may be done by transferring the slurry from the flash mixer 58 to a hydrocyclone 60 just as the tailings begin to flocculate. A large portion of the water is removed at this stage, after which the tailings are then placed on the berm 62 of the tailings pond 12 and allowed to drain for between 24 and 72 hours until the tailings are sufficiently dewatered. As a large portion of the berm on the side of the tailings pond is generally sand obtained from processing tar sands, the drainage for this step is suitable. Once sufficiently dewatered, the flocculated tailings are pushed back into the tailings pond 12. The tailings may be mixed with a portion of the sand contained in the berm in order to help them settle properly. After an entire tailings pond has been treated in order to reduce the amount of suspended solids to acceptable levels, the supernatant layer of water overlying the now-settled tailings may then be pumped off, and can be reused in other drilling or mining operations, or returned to the environment. Referring to FIG. 4, the area formerly covered by the tailings pond may then be recovered and returned to nature by spreading a layer of dirt 64 over the tailings and planting greenery.

Referring to FIG. 5, at least a portion of the agitated tailings may be supplied as a primary flow into a second jet pump (illustrated as jet pump 54A). In some methods of separating hydrocarbons from a mixture comprising a hydrocarbon fraction, a solids fraction, and a water fraction, at least a portion of the mixture is supplied as a primary flow into jet pump 54A. Referring to FIG. 1, in some embodiments, the second jet pump may be, for example, auxiliary jet pump 54. At this stage, the at least a portion of the agitated tailings may comprise a hydrocarbon fraction, a water fraction, and a solids fraction. A user may tailor the supplied portion of the agitated tailings to cater to his/her needs. Referring to FIG. 1, it is desired to further process and recirculate mainly the water fraction, and thus the at least a portion of the agitated tailings is withdrawn from an intermediate portion of the floatation cell 42, and supplied to auxiliary jet pump 54. Referring to FIG. 5, it is desired to process mainly the solids fraction, and thus the portion of the agitated tailings are withdrawn from bottom portion 44 of floatation cell 42A. In general, the at least a portion of the agitated tailings comprises at least a portion of at least one of the hydrocarbon fraction, the water, and the solids fraction.

Referring to FIG. 5, a flow of gas is then supplied to a mixing chamber of the second jet pump 54A, through for example line 130. The second jet pump is then operated using the at least a portion of the agitated tailings and the flow of gas to agitate the at least a portion of the agitated tailings and supply an agitated mixture from the second jet pump into a second separator, for example floatation cell 42B, to effect at least a partial phase separation of the hydrocarbon fraction from the solids fraction. The at least partial phase separation may then be effected, for example, in a subsequent separator, illustrated as floatation cell 42B.

The agitated mixture may then be supplied into a separator to effect at least a partial phase separation of the hydrocarbon fraction from the solids fraction. Referring to FIG. 5, at least a portion of the hydrocarbon froth may be removed from the separator (illustrated as flotation cell 42B, for example) by removing the hydrocarbon from an upper fraction of the separator. This is accomplished in the embodiment illustrated by withdrawing hydrocarbon froth from flotation cell 42B via line 120.

In some embodiments, the method may comprise a step of supplying at least a portion of at least one of the solids fraction, the water, and the hydrocarbon fraction from the at least one separator to a mixing chamber of an auxiliary jet pump 54 for additional separation. In the example of FIG. 1, at least a portion of the water in floatation cell 42 is supplied to auxiliary jet pump 54. The at least a portion of the water is then returned to floatation cell 42. It should be understood that the at least a portion of the water likely contains portions of the solids fraction and the hydrocarbon fractions. The auxiliary pump processing allows further separation to occur. In some embodiments, the auxiliary pump supplies the at least a portion of the agitated tailings to a further separator.

As described above, in the embodiment illustrated in FIG. 1, jet pump 54 is illustrated as supplying the agitated mixture back into the flotation cell 42, from where the mixture was initially drawn from. Supplying may mean, for example, propelling. Referring to FIG. 5, in some embodiments, the mixture has been initially supplied to an initial separator, illustrated for example as flotation cell 42A. In some embodiments, the mixture may be processed with a first jet pump (for example jet pump 18 in FIG. 1) prior to supplying at least a portion of the mixture as a primary flow into the jet pump 54A. In the embodiment illustrated, the agitated mixture is then supplied into a subsequent separator, illustrated for example as flotation cell 42B. Hydrocarbon froth may be removed from the separator. In some embodiments, at least a portion of the hydrocarbons may be removed from the separator. Referring to FIG. 5, the at least a portion of the mixture supplied to jet pump 54A may comprise the highest density portion of the mixture. In some embodiments, such as the one illustrated, the at least a portion of the mixture supplied to jet pump 54 is withdrawn from the separator (illustrated as a settling tank or flotation cell 42A) from a lower portion of the separator, in order to ensure that it is at least a higher density portion of the mixture.

Referring to FIG. 5, at least a portion of the agitated mixture may then be supplied as a primary flow into a subsequent jet pump 54B. A flow of gas may be supplied to a mixing chamber of the subsequent jet pump 54B, and the subsequent jet pump 54B operated using the at least a portion of the agitated mixture and the flow of gas to agitate the at least a portion of the agitated mixture. A subsequent agitated mixture may then be supplied from the subsequent jet pump 54B into a subsequent separator (illustrated as flotation cell 42C) to effect at least a partial phase separation of the hydrocarbon fraction from the solids fraction. Hydrocarbons may be removed from at least the subsequent separator (illustrated as flotation cell 42C) and the separator (illustrated as flotation cell 42B) and combined, via line 120 for example.

Referring to FIG. 11, as described above, tailings may be supplied from first tailings pond 12 (illustrated as first tailings pond 12A in FIG. 11). In some embodiments, at least a portion of the water is separated from the hydrocarbon fraction and solids fraction, and the at least a portion of the water is returned to a second tailings pond 12B different from the first tailings pond (illustrated as pond 12A in FIG. 11). Separated may comprise separating using any of the embodiments described herein, for example jet pump processing into a floatation cell. Separating may further comprise separating the at least a portion of the water fraction from the hydrocarbon fraction and the solids fraction in a separator, such as floatation cell 42 (shown in FIG. 1) for example. In addition, the method may further comprise the step of separating at least a portion of the solids fraction from the hydrocarbon fraction and the water fraction in a separator.

In other embodiments, at least a portion of the water is separated from the hydrocarbon fraction and the solids fraction, and the at least a portion of the water is returned to the first tailings pond 12A, where the tailings were initially removed from. In some embodiments, at least a portion of the solids fraction may be separated from the hydrocarbon fraction and the water, and the at least a portion of the solids fraction returned to the first tailings pond 12A. In other embodiments, the at least a portion of the solids fraction separated from the hydrocarbon fraction and the water may be returned to the second tailings pond 12B different from the first tailings pond 12A. In some embodiments, the mixture supplied to the mixing chamber could be a combination of streams from various tailings ponds. Separated may comprise separating using any of the embodiments described herein, for example jet pump processing into a floatation cell. Separating may further comprise separating the at least a portion of the water fraction from the hydrocarbon fraction and the solids fraction in a separator, such as floatation cell 42 (shown in FIG. 1) for example.

Referring to FIG. 11, in some embodiments of a method of recovering at least one tailings ponds, tailings are removed from a first tailings pond 12A, the tailings comprising a solids fraction, a hydrocarbon fraction, and a water fraction. The tailings may be removed via line 188, for example. At least a portion of the water fraction is then separated from the hydrocarbon fraction and the solids fraction. This may be accomplished using, for example, the methods disclosed herein. Referring to FIG. 2, in some embodiments this may be accomplished as follows: a primary flow comprising water may be supplied to a jet pump, the tailings supplied to a mixing chamber 38 of the jet pump 18, and the jet pump 18 operated using the primary flow. The tailings are agitated to effect at least a partial separation of the water fraction from the hydrocarbon fraction and the solids fraction. At least a portion of the water fraction may then be returned to a second tailings pond 12B different from the first tailings pond 12A. The water fraction may be returned by, for example, line 190. In some embodiments, at least a portion of at least one of the solids fraction, the water fraction, and the hydrocarbon fraction may be removed in a separator, according to, for example, the methods disclosed herein. The at least a portion of the water fraction may be separated via settling the agitated tailings. The agitated tailings may also be treated in a second jet pump. If at least a portion of the solids fraction has been removed, it may be returned to at least one of the first tailings pond 12A and the second tailings pond 12B.

Referring to FIG. 11, in some embodiments of a method of recovering a tailings pond 12A, tailings are removed from a first tailings pond 12A, the tailings comprising a solids fraction, a hydrocarbon fraction, and a water fraction. At least a portion of the water fraction is then separated from the hydrocarbon fraction and the solids fraction using at least a jet pump. This separation may be carried out, for example, using the methods disclosed herein. The at least a portion of the water fraction may then be returned to the tailings pond 12A. This allows a single tailings pond 12A to be recovered. Variations of the method are possible in accordance with other embodiments disclosed herein.

Referring to FIG. 11, in some methods of recovering a tailings pond, tailings are removed from a first tailings pond 12A, the tailings comprising a solids fraction, a hydrocarbon fraction, and a water fraction. At least a portion of the solids fraction is separated from the hydrocarbon fraction and the water fraction, and the at least a portion of the solids fraction is returned to the first tailings pond 12A. The solids fraction may be separated using any of the methods disclosed herein, for example. In one embodiment, the solids fraction is separated using at least one jet pump. In some embodiments, at least a portion of the water fraction is separated and returned to at least one of the first tailings pond 12A and the second tailings pond 12B. Separated may comprise separating using any of the embodiments described herein, for example jet pump processing into a floatation cell. Separating may further comprise separating the at least a portion of the solids fraction from the hydrocarbon fraction and the water in a separator, such as floatation cell 42 (shown in FIG. 1) for example.

Referring to FIG. 11, in some methods of recovering a series of tailings ponds, tailings are removed from a first tailings pond 12A, the tailings comprising a solids fraction, a hydrocarbon fraction, and a water fraction. The solids fraction is separated from the hydrocarbon fraction and the water fraction, and the solids fraction is returned to the second tailings pond 12B different from the first tailings pond. This way, the solids fraction removed from one pond 12A may be used to fill another pond 12B. In this manner, a series of ponds may be recovered and used to fill a single, or several, other ponds. The solids fraction may be separated using any of the methods disclosed herein, for example. In one embodiment, the solids fraction is separated using at least one jet pump. In some embodiments, at least a portion of the water fraction is separated and returned to at least one of the first tailings pond 12A and the second tailings pond 12B. Separated may comprise separating using any of the embodiments described herein, for example jet pump processing into a floatation cell. Separating may further comprise separating the at least a portion of the solids fraction from the hydrocarbon fraction and the solids fraction in a separator, such as floatation cell 42 (shown in FIG. 1) for example. In addition, the method may further comprise the step of separating at least a portion of the water fraction from the hydrocarbon fraction and the solids fraction in a separator.

In some embodiments, the secondary flow comprises more solids by mass than the primary flow.

In some embodiments, the secondary flow has a first density, and the primary flow is supplied from the first tailings pond 12A and has a second density. In some embodiments, the second density is different than the first density. In further embodiments, the second density is lower than the first density. Referring to FIG. 2, in some methods of recovering at least one tailings pond, a material having a first density is supplied from the at least one tailings pond 12 (shown in FIG. 1) to mixing chamber 38 of jet pump 18. Referring to FIG. 11, the material may be supplied from, for example, tailings pond 12A, the material having a hydrocarbon fraction and a solids fraction. Referring to FIG. 2, a primary flow having a second density is supplied from the at least one tailings pond to jet pump 18, the second density being different than the first density. The primary flow may comprise water. In some embodiments, the second density is lower than the first density. Referring to FIG. 11, in this way, the primary flow may be supplied from either one of tailings ponds 12A or 12B, for example. In some embodiments, the primary flow may not be supplied from the at least one tailings pond. The jet pump 18 is then operated using the primary flow to agitate the material and supply agitated material from jet pump 18 to effect at least a partial phase separation of the hydrocarbon fraction from the solids fraction. The agitated material may be supplied from the jet pump into a separator. In some embodiments, the material and the primary flow are from different tailings pond.

Referring to FIG. 2, in some embodiments, the secondary flow has a first liquid content, the primary flow has a second liquid content, and the second liquid content is different from the first liquid content. In further embodiments, the second liquid content is higher than the first liquid content. Referring to FIG. 2, in some methods of recovering at least one tailings pond, a material having a first liquid content is supplied from the at least one tailings pond 12 (shown in FIG. 1) to mixing chamber 38 of jet pump 18. The material has at least a hydrocarbon fraction and a solids fraction. A primary flow having a second liquid content is supplied to the jet pump 18. In an embodiment, the second liquid content is higher than the first liquid content. In this embodiment, the second liquid content may be predominantly water. In another embodiment, the second liquid content is lower than the first liquid content. In this embodiment, the first liquid content may be predominantly water. The net effect is that one of the streams dilutes the other in the mixing chamber 38 of the jet pump 18. Referring to FIG. 11, in this way the material may be supplied from either one of ponds 12A and 12B, and the primary flow may be supplied from either one of ponds 12A and 12B. In some embodiments, the primary flow may not be supplied from the same tailings pond as the material. The jet pump is then operated using the primary flow to agitate the material and supply agitated material from the jet pump 18 to effect at least a partial phase separation of the hydrocarbon fraction from the solids fraction. These methods are effective, in that they allow multiple sources of water and tailings to be used, and further because the sources of water may be all from tailings ponds. This way, in some embodiments, fresh water is not required to be removed from, for example, a nearby river or lake to aid in the processing.

Referring to FIG. 11, in some embodiments, the secondary flow is supplied from a first vertical level (indicated by the inlet 200 of line 196 for example) from the first tailings pond 12A. The primary flow is supplied from a second vertical level (indicated by the inlet 202 of line 188 for example) from the first tailings pond 12A. As illustrated, the second vertical level is different than the first vertical level. In some embodiments, such as the one illustrated in FIG. 11, the second vertical level is higher than the first vertical level. Referring to FIG. 2, in some methods of recovering a tailings pond, a first material from a first vertical level is supplied from the tailings pond to mixing chamber 38 of jet pump 18, the material having a hydrocarbon fraction and a solids fraction. Referring to FIG. 11, the first vertical level may be indicated by the inlet 200 to line 196 for example, from tailings pond 12A. A second material from a second vertical level is supplied from the tailings pond as a primary flow to the jet pump 18, the second vertical level being different than the first vertical level. The second vertical level may be indicated by the inlet 204 to line 198, for example, from the same tailings pond 12A. In this way, the primary flow is drawn from a higher vertical level of tailings pond 12A, and is thus more dilute in solids than the secondary flow. In some embodiments, the first and second vertical levels may be indicated by the inlets to lines 198 and 196, respectively, for example. In these embodiments, the second material is drawn from a lower vertical level than the first material, effectively resulting in dilution of one of the flows entering the jet pump 18. The jet pump 18 is then operated using the second material to agitate the first material and supply the agitated material from the jet pump 18 to effect at least a partial phase separation of the hydrocarbon fraction from the solids fraction.

Figure 10:
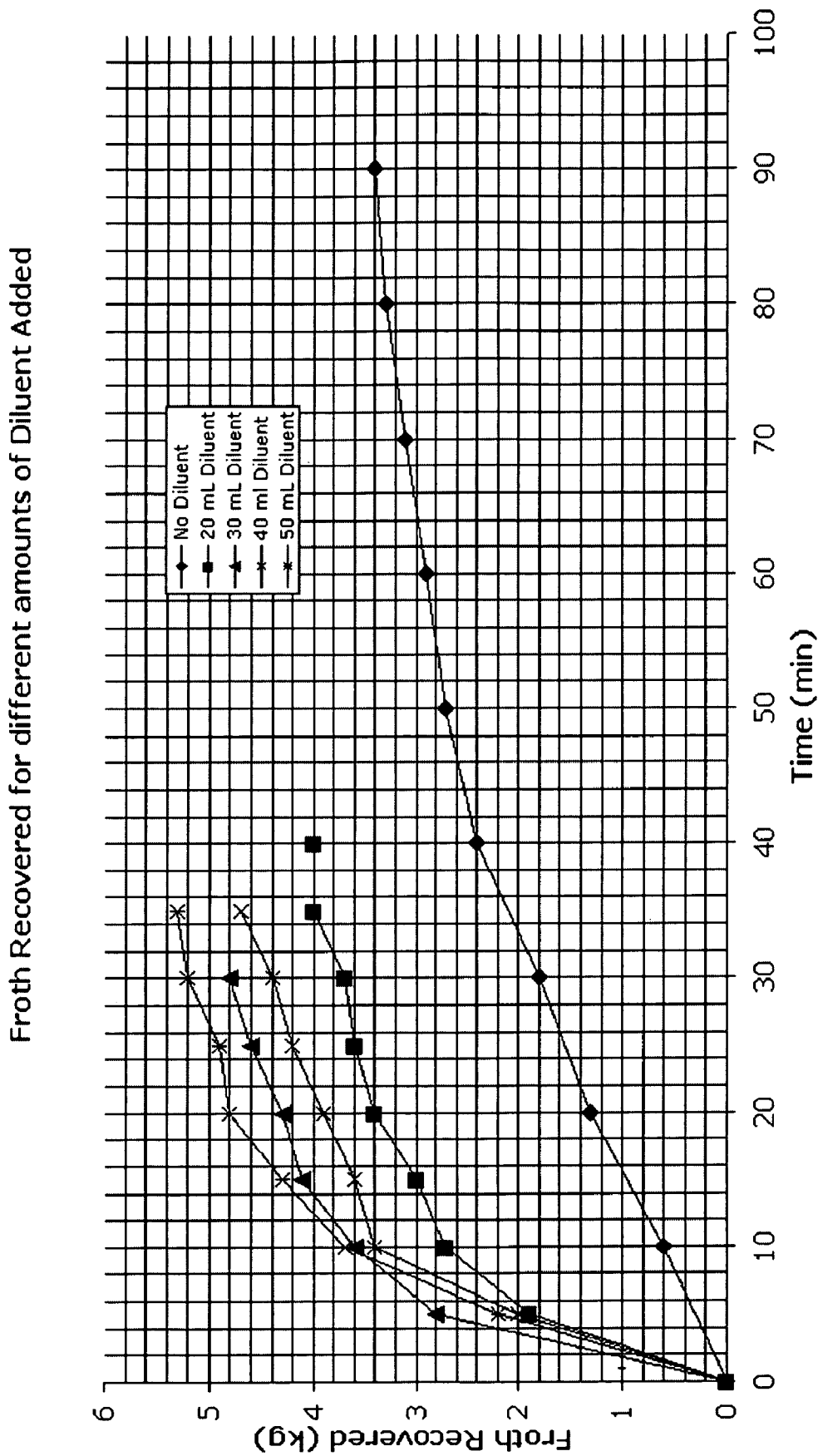
FIG. 10 is a graph illustrating the effects of adding a diluent to the tailings prior to processing.

Referring to FIG. 2, in some embodiments, the step of supplying a secondary flow further comprises the steps of supplying tailings diluted with a diluent to the mixing chamber 38 of the jet pump 18. In some embodiments, a diluent, for example a solvent, may be added to the tailings prior to processing the tailings in any of the embodiments described herein. The diluent may be for example a non-polar solvent. The diluent may be, for example naptha. Referring to FIG. 1, in some methods for at least partial phase separation of a mixture having a solids fraction and a hydrocarbon fraction, a mixture may be diluted with a diluent to give a diluted mixture. This is illustrated in FIG. 1, as a mixture is drawn from tailings pond 12 through line 189. A diluent, stored in container 191, is then added via line 194 to the mixture in line 189 to create a diluted mixture. The mixture may be diluted in, for example, a flash mixer 195. Referring to FIG. 2, the diluted mixture is then supplied to a mixing chamber 38 of a jet pump 18, via, for example, inlet 27, and a primary flow supplied to an input, for example nozzle 34, of the jet pump 18. The jet pump 18 is operated using the primary flow to agitate the diluted mixture and supply an agitated mixture from the jet pump 18 to effect at least a partial phase separation of the hydrocarbon fraction from the solids fraction. The diluent may comprise a non-polar solvent, for example naptha. In some embodiments, the non-polar solvent is a hydrocarbon solvent. The mixture may be diluted with at least 1.5 mL diluent per kilogram of mixture, for example. In other embodiments, the mixture is diluted with less than or equal to 10% by weight of the hydrocarbon fraction. FIG. 10 illustrates some of the effects of adding such a diluent, in different amounts to a 13 kg sample of MFT prior to processing. The graph illustrates that, for greater amounts of diluent, the time required to recover froth is shortened, and a greater amount of froth may be recovered in that time.

In some embodiments, a non-polar diluent may be added to at least the at least a portion of mixture, as for example prior to the mixture being injected into a jet pump. In some embodiments, a non-polar diluent may be added to the agitated mixture.

Referring to FIG. 5, in some embodiments at least a portion of the solids fraction may be removed from the separator. This is illustrated in FIG. 5 by the removal of solids from flotation cell 42D via line 126. The solids may then be sent to a clarifier, for example. In some embodiments, at least a portion of the solids may be dewatered.

Referring to FIG. 2, in some embodiments of a method of recovering tailings pond 12, tailings may be supplied from tailings pond 12 to mixing chamber 38 of jet pump 18. The tailings supplied from the tailings pond 12 may comprise a slurry comprising more solids by mass than the primary flow. The tailings may have at least a hydrocarbon fraction and a solids fraction. A primary flow is supplied to the jet pump 18, through for example nozzle 34, and a flow of gas is supplied to the mixing chamber 38 of jet pump 18, through for example gas inlet 37. The jet pump is operated using the primary flow to agitate the tailings and flow of gas to effect at least a partial phase separation of the hydrocarbon fraction from the solids fraction. The flow of gas may be adjusted to ensure that a sufficient amount of gas is supplied to the mixing chamber 38. At least a portion of the hydrocarbon fraction may then be separated from the tailings in at least one separator (illustrated for example by flotation cell 42 in FIG. 1). Referring to FIG. 1, separating at least a portion of the hydrocarbon fraction from the tailings in the separator may comprise, for example, supplying the tailings in the separator to auxiliary jet pump 54. The tailings separated in the separator may then be, for example, flocculated and dewatered (as illustrated in FIG. 8, for example). The dewatered, flocculated tailings may then be returned to the tailings pond 12. In some embodiments, the dewatered, flocculated tailings may be returned to another tailings pond.

Referring to FIG. 2, in some methods of recovering a tailings pond 12, tailings are supplied from the tailings pond 12 to mixing chamber 38 of jet pump 18. The tailings have a hydrocarbon fraction and a solids fraction. A primary flow is supplied to the jet pump. The jet pump 18 is operated using the primary flow such that the tailings are agitated to effect at least a partial phase separation of the hydrocarbon fraction from the solids fraction. At least a portion of the hydrocarbon fraction is then separated from the tailings in at least one separator (illustrated as, for example, flotation cell 42), and the tailings are dewatered. The dewatered tailings may then be returned to the tailings pond 12, or to a different tailings pond.

In some embodiments, dewatering comprises adding at least one flocculant. The flocculant may comprise an anionic long chain polymer, for example. Dewatered tailings may be returned to the tailings pond 12. In some embodiments, the dewatered tailings may be returned to another tailings pond.

Referring to FIG. 1, an exemplary flow chart illustrating a method for treating tailings found in a tailings pond 12 is shown. A water pump or pumps 14, such as centrifugal pumps, are used to draw water from, for example, the layer 16 of the tailings pond 12. In some embodiments, water may be drawn from layer 13 (shown in FIG. 3). The water pumps 14 may also be used to create a high pressure stream of water to operate jet pump 18, referred to as a primary flow. As the primary flow may be from the top of the tailings pond, this primary flow may contain, for example, 10% or more tailings by volume. Other sources of water for the primary flow will be apparent to those skilled in the art, however, an additional source of tailings may help to increase the rate at which tailings are treated. A secondary flow may be obtained from the slurry in, for example, at least one of the settled solids zone 22 and the intermediate layer 16 of the tailings pond 12, which is transferred by a slurry pump 24, such as a submersible, centrifugal pump to a hopper 26 that feeds the jet pump 18. The secondary flow may contain between 20% and 50% solids by mass, and may contain between 30% and 35%. In some embodiments, the secondary flow may contain more solids by mass than the primary flow. In some embodiments, the primary flow may comprise water and less than 20% solids by mass. An advantage of supplying tailings through the primary flow is to allow a user to increase the content of tailings within the jet pump 18 without overburdening the slurry pumps 24 used to provide the secondary flow. The slurry pumps 24 may have limits as to the tailings content they are able to transfer. The water and tailings may be obtained from different sources and using different equipment, as will be recognized by those skilled in the art. However, the above steps are useful when reclaiming a tailings pond.

The jet pump 18 may receive tailings from the hopper 26 through the suction chamber inlet 27, and water from the water pumps 14. The jet pump 18 may also receive air from an air compressor 28, which may be protected by an air filter 29. In some embodiments, the jet pump 18 may draw air in from the atmosphere. Adequate results may be obtained, for example, by providing approximately equal volumes of tailings and air. However other ratios may also be used. Optionally, the jet pump 18 may also be fed with chemicals from a chemical feed tank 30 through chemical feed pumps 31. The feed pumps 31 may be centrifugal pumps, or they may be metered pumps to provide additional control over the injection of the chemicals. The chemicals, such as calcium hydroxide, may be included to help separate the hydrocarbons from the tailings. The chemicals may also comprise a diluent.

Referring to FIG. 2, the operation of the jet pump 18 is described in further detail. Unlike other pumps, a jet pump may have no moving parts. An exemplary jet pump consists of the following: a jet supply line 32, nozzle 34, a suction chamber 36, a mixing chamber 38 and a diffusor 40 leading to the discharge line 20. Mixing chamber 38 may include suction chamber 36. In some embodiments, mixing chamber 38 includes the interior of jet pump 18. In a jet pump, pumping action may be created as a primary flow of a fluid (liquid, steam or gas for example) passes at a high pressure and velocity through the nozzle 34 and into a suction chamber 36. In the embodiment described herein, water from water pumps 14 (shown in FIG. 1) is fed into the jet pump 18 at jet supply line 32. The water passes through inlet nozzle 34, where it meets tailings, gas and chemicals at the suction chamber 36. The tailings may be gravity fed through suction chamber inlet 27, and as shown in FIG. 1, the chemicals, if used, may be combined with the tailings at some point between the hopper 26 and the suction chamber inlet 27. The gas is input into the suction chamber 36 by, for example, leaving a portion of the suction chamber inlet 27 open such that air is drawn in from atmosphere in addition to any air/gas introduced through hopper 26, or in some embodiments, by supplying gas to suction chamber inlet 27 by a controlled gas source, through inlet 37 for example, as shown in FIG. 1. The high pressure water stream from the supply line 32, which may be at 120 psi for example, is converted within the jet pump nozzle 34 into the primary flow, which is a high velocity water jet. The substantial pressure drop within the jet pump draws in the secondary flow, made up of tailings, chemicals (if used) and gas, into the jet pump where it is mixed with the primary flow to achieve a resultant percent solids concentration in the range of 25% or less by volume.

Upon entry into the jet pump 18, the tailings from hopper 26 are entrained and mixed with the water from the nozzle 34, which undergoes a substantial pressure drop across the jet pump 18 and causes extreme mixing of the slurry. The extreme mixing and pressure drop may cause cavitation bubbles to develop on the inside of the chamber 36, which may implode on solid particles to enhance the hydrocarbon recovery from the tailings by encouraging separation. The substances are then mixed and agitated within the mixing chamber 38 such that the air bubbles, due to the added air and any entrained air, within the mixture partially dissolve into the water/tailings slurry. By adding additional air to the chamber 36, the separation of the hydrocarbons from the tailings is improved. This effect is realized through the introduction of additional air into the mixture, which results in a mixture that contains more air than a conventionally aerated slurry. This addition of air may be controlled to create effervescence in the separator into which the agitated mixture may be supplied. The nature of this effect is not known, but is thought to be due to the pressures involved in the jet pump 18. Also, in some embodiments whereby air is supplied to the mixing chamber of the jet pump from a source distinct from the mixture and the primary flow, air may be injected into the mixture without interfering with the flow of either the primary flow or the mixture. This allows the amount of air introduced into the jet pump to be easily controlled to ensure that adequate amounts of air are supplied to the mixing chamber, without affecting the other flows.

Referring again to FIG. 1, the slurry containing the dissolved and dispersed air that exits the jet pump 18 may be transferred into a separator. In the depicted example, the separator is a dissolved air flotation cell 42, which may be a type of settling tank. In some embodiments, cell 42 may be a Denver cell with suppliers for aeration. There may be three flotation units in a Denver cell, for example. As the tailings settle toward the bottom, the air bubbles that were dissolved in the jet pump 18 break out of solution, and, along with the air injected into the flotation cell 42, carry the hydrocarbon contaminants with them to the top of the flotation cell 42, where a hydrocarbon froth is formed. The froth may be removed from an upper portion 46 of the cell 42, and transferred by pumps 48, such as positive progressive cavity pumps, to a secondary treatment stage, such as the froth washing stage for example. The upper portion may be, for example, the top of the cell 42. This secondary treatment involves additional processing to obtain a usable form of hydrocarbons. The recovered hydrocarbons from this process may be used to at least subsidize, and preferably fully cover the costs associated with the recovery of the tailings pond.

Referring to FIG. 1, the tailings may be removed from the a bottom or lower portion 44 of the flotation cell, and transferred by pumps 50, such as positive progressive cavity pumps, to be disposed of or treated. Lower portion 44 may be, for example, the bottom of the cell. In some embodiments, instead of being disposed of, the tailings may be injected by pumps 52 into an auxiliary jet pump 54. As shown, air is injected into the mixing chamber of auxiliary jet pump 54, with the primary flow containing the tailings to be treated. The effect that helps separate the bitumen from the tailings, however, is as described above. Other arrangements may also be used which would repeat the steps described above. However, those skilled in the art will recognize that some modifications can be made and may be necessary depending on the specific application, such as the source of water, the injection of chemicals, etc. This additional treatment by a jet pump may be used in order to sufficiently remove hydrocarbons to properly dispose of the fine tailings. The tailings may need to be passed through one or more auxiliary jet pumps 54 before an acceptable level of hydrocarbons in the tailings is reached for the operator's purposes.

Jet pumps suitable for the steps described above may be available in the industry, such as those manufactured by Genflo Pumps. However, some care must be taken in choosing the jet pump, and it is preferred to use a jet pump similar to the one shown in FIG. 2. The jet pump used in the steps above functions as, for example, an ejector, an injector, or an eductor, distinct from a venturi pump and an airmover. A venturi has little in common conceptually with a jet pump. A venturi is a pipe that starts wide and smoothly contracts in a short distance to a throat and then gradually expands again. It is used to provide a low pressure. If the low pressure is used to induce a secondary flow it becomes a pump, resulting in a loss of pressure in the throat. If the secondary flow is substantial the loss may be too great to have a venturi operate like a pump. To operate like a pump it would have to be redesigned as a jet pump. Venturi pumps have limited capacity in applications like chemical dosing where a small amount of chemical is added to a large volume of fluid. A jet pump may be a pump that is used to increase the pressure or the speed of a fluid. Energy is put into the fluid and then taken out by a different form. In a jet pump energy is added by way of a high speed jet fluid called the primary flow. In the design shown in FIG. 2, the primary flow is produced by jet nozzle 34. Energy is taken out mostly as increased pressure of a stream of fluid passing through. In a jet pump this stream is called the secondary flow and it is said to be entrained by the primary flow. A jet pump is designed to be energy efficient. A venturi pump does not have the capacity to induce large volumes of flow. On the other hand, a jet pump may be able to induce large volumes of flow, and is energy efficient. Unlike a venturi pump, a jet pump may consist of a nozzle, mixing chamber and diffusor. In a jet pump, these components are specifically engineered to have the pump operate energy efficiently. A venturi pump does not have a defined nozzle, but instead a constriction in the pipe. It also does not have a defined mixing chamber.

The jet pump 18 may operate at a high Reynolds number, above 250,000, and preferably in the order of 650,000 to 750,000. Such a Reynolds number may be obtained by a combination of high pressure, for example 80 psi or more, and a sufficiently long mixing chamber, as for example shown in FIG. 2 to effect a matrix transformation in the mixing chamber. Once the contaminants have been removed from the tailings, further treatment allows the tailings to be returned to the tailings pond in a form that will settle and allow the water to be pumped off. The first step is to consolidate the treated tailings. Solids consolidation may comprises two procedures: flocculation and dewatering as described herein.

Referring to FIG. 3, a method of treating a mixture comprising tailings is illustrated. Referring to FIG. 5, the tailings have been at least partially separated from the mixture in a separator, such as a settling tank. In some embodiments, the mixture is contained in a settling tank. In the embodiment illustrated, the settling tank may be represented by flotation cell 42C. In other embodiments, the settling tank may be any other type of separator that is capable of separating tailings. At least a portion of the tailings may be supplied from the mixture in the separator. Referring to FIG. 8, a flocculant may be added to create flocculated tailings, and the flocculated tailings dewatered according to the embodiments described herein. In some embodiments, the lower portion 44 of the mixture in the settling tank may be removed.

In order to optimize the performance of the jet pump, it has been found that a higher ratio of the length to inner diameter of the discharge line 20 may be used. For example, in many applications, the ratio is about 4:1, but beneficial results have been obtained by extending the length to between 30:1 and 50:1. Along with extending the length, a larger diameter for the discharge line 20 may also be used. It has also been found that, by processing the output of the jet pump in another jet pump, either using a feedback loop or by using an additional jet pump, the oil froth that is produced is much more stable, and more oil is removed from the tailings. Finally, the back pressure in the mixing chamber may be increased by removing the diffuser 40, which increases the back pressure therefore and the dissolved air component in the mixing chamber.

The above description has been given using the recovery of a tailings pond as an example. However, the principles described above may be applied to different situations as well. For example, the material being fed into the mixing chamber may be mixed in a way that adds air (fluffing). In addition to entrained air being added by fluffing, additional air may be added that is then dissolved in the mixing chamber of the jet pump. This technique may also be applied to the treatment of many different substances, for example products of hydrocarbon mining and drilling, such as tailings, drill cuttings, tar sands, etc. whether treated or untreated, and using any number of treatment techniques involving a jet pump, may benefit from adding air to a jet pump. In one example, it was found that, by including an additional jet pump at the end of a tar sands extraction process, an additional cut of bitumen was recovered. Furthermore, the jet pump treatment process with entrained air may also be applied to other situations outside the oil and gas industry where jet pumps are used to treat other substances, such as sewage or pulp effluent treatment. By allowing the jet pump to draw gas in addition to that already dissolved or entrained by the primary or secondary flow, the gas content within the mixing chamber can be increased, and can increase the effectiveness of the process taking place, whether it be separation of hydrocarbons from solids, or breaking down biological material via aerobic processes.

An exemplary overall process flow diagram is illustrated in FIG. 7. It should be understood that the flow diagram of FIG.

7 may illustrate an agglomeration of several embodiments or methods combined together. The processes described in this document may combine the concepts of bitumen removal with clay flocculation. Arrow lines are used to indicate the addition or production of a species or form of energy into or from a step in the process. Referring to FIG. 7, a primary flow and a mixture are processed in a bitumen separation and recovery step 66 from lines 68 and 70, respectively. Step 66 may comprise, for example jet pump and floatation cell processing according to for example the embodiment of FIG. 1. From step 66, bitumen froth is produced via line 67 and processed in a bitumen froth washing step 72, while clean solids produced in step 66 are processed in a sedimentation and water recovery step 74 via line 69. Froth may be washed in step 72 by, for example, the embodiment illustrated in FIG. 6. Step 74 may be accomplished using the embodiments of FIGS. 5 and 6, for example. Heat may be added to the bitumen froth in line 67, for example, during or prior to step 72. In step 72, solids may be separated and sent via line 78 to step 74. Treated froth from step 72 is then sent via line 80 to a dilbit production step 82. Dilbit means diluted bitumen. In step 82, diluent may be added via line 84, and heat may be added via line 86. Diluted bitumen and stackable solids are produced from step 82 via lines 88 and 90, respectively. Dilbit production is illustrated in FIG. 6. The stackable solids may be disposed of, while the diluted bitumen may be further processed. In addition, process water may be produced in step 82, the water being sent to a water treatment step 92 via line 94 to be recycled. Water treatment step 92 may include, for example, the embodiment illustrated in FIG. 9.

A coagulant may be added into sedimentation and recovery step 74 via line 96. In addition, a coagulant and an aid may be added to step 92 via line 93. Process water and watered solids may be produced in step 74 via lines 98 and 100, respectively. Steps 74 and 92 may include the embodiments of FIGS. 8 and 9. Process water is sent to step 92 via line 98. Watered solids may be sent to a de-watering and disposal step 102 via line 100, which may be, for example, in-situ. In addition, solids produced from step 92 may be sent to step 102 via line 104. Further, recycled water produced in step 92 may be, for example, returned to the environment, used for further oil sands production, or returned to the process, via lines 106, 108, and 110, respectively. A coagulant may be added to step 102 via line 112. Step 102 may produce de-watered solids and water via lines 114 and 116, respectively. Water produced via line 116 may be, for example, draining water returned to a tailing pond.

Referring to FIG. 5, an exemplary schematic designed to carry out bitumen separation and recovery step 66 is illustrated. The MFT feed 116 (which may have, for example, an average bitumen/solids ratio of 0.1/1, see Table 1) may be loaded through a hopper 26 into pump 18 and into a pump-driven flotation cell 42. The pump 18 may provide dissolved and dispersed air, at the same time diluting the MFT with a primary flow via line 118. The primary flow, also called the dilution water, may be either be clear (as typically from the top pond layer 13) or can be the turbid water from the intermediate pond layer 16. In the latter case one waste stream is used to process another. The flotation cell 42 can be operated in a recirculating mode (as illustrated in FIG. 1) or in a once through mode where it would typically be linked to other cells 42 in a sequence as illustrated. The flotation cell 42 may be operated at ambient temperatures (as low as 6° C. or lower providing the mixture does not freeze), and the bitumen is removed as a froth via line 120 from each of cells 42A, B, C, and D. The removed froth may have a bitumen/solids ratio of 1.5/1, for example (see Table 3). Materials produced from, for example, at or near the bottom of a preceding cell 42 may be recirculated into a subsequent cell 42 via line 122, pump 52, line 126, jet pumps 54A, B, and C, and line 128, for example. Clean mature fine tailings may be produced from the final one of lines 128. Air may be injected into pumps 54 via lines 130. Air is used to mix, shear, and aerate the flow of materials through the system.

Referring to FIG. 6, an exemplary schematic illustrating froth washing and dilbit production is detailed. The bitumen froth may be supplied via line 123 to a pump 130, for example. The froth may be concentrated to a bitumen/solids ratio of close to 5/1, for example, using the same type of flotation cell 42E in a recirculating mode at a raised temperature. In one embodiment the raised temperature is approximately 60° C. The fluid in cell 42E may be heated by, for example, a heat exchanger 134. This treated froth may be removed from cells 42E, 42F via lines 136, diluted with a solvent via line 138, and then transferred to a separation device 140. The solvent may be, for example, a naphtha type solvent at, for example, a solvent/bitumen ratio of 0.6/1. The separation device 140 may be, for example, a centrifuge. An additional pump 142 and heat exchanger 144, for example, may be employed in the system. The separation device 140 may also be a 3-pharse decanter, for example. Dilbit, process water, and stackable solids may be removed from device 140 via lines 88, 90, and 92, respectively. Bench scale centrifugation at approximately 1000 g has resulted in a diluted bitumen (dilbit) product with a BS&W content of 0.05 or less. As in FIG. 5, solids produced from cells 42 in FIG. 6 may be produced via lines 146 and pumped via jet pumps 148. Pump 148, if leading to a subsequent cell 42, may lead to another pump 150, to which air is added via line 152. Pump 152 then leads to a subsequent cell 42 via line 154. The final pump 148 in the sequence may pump material to a clarifier via line 156.

Exemplary Results.

Many bitumen removal/solids consolidation sequences have been carried out using continuously improved small pilot scale equipment. Some of the results that have been obtained are listed in the sequence of Tables 1-3 below. The average values for component percentages in the feed and product streams (illustrated by the character x) provide an evaluation of the overall process. S and RSD values (corresponding to standard deviation and relative standard deviation, respectively) are also illustrated in the tables. Samples were sent to AGAT Laboratories for analysis. Table 1 illustrates an analysis of the composition of mature fine tailings removed from a tailings pond 12 before processing in any of the methods described herein. An average bitumen/solids ratio of 0.13 is observed in the tested MFT.

TABLE 1

Mature Fine Tailings

| Date Reported | Bitumen % | Solids % | Water % | Bitumen/Solids Ratio |
|---|---|---|---|---|
| May 3, 2007 | 4 | 33 | 63 | 0.12 |
| Jul. 25, 2007 | 5 | 37 | 58 | 0.14 |
| Oct. 16, 2007 | 5 | 36 | 59 | 0.14 |
| Jan. 16, 2008 | 4 | 38 | 58 | 0.11 |
| X | 4.5 | 36 | 60 | 0.13 |
| S | 0.8 | 2 | 2 | 0.015 |
| RSD % | 13 | 6 | 3 | 12 |

Table 2 illustrates an analysis of the composition of the solids fraction (consolidated mature fine tailings, for example) after processing according to the embodiments of FIG. 1 and FIG. 8. More specifically, the analysis is of the flocculated solids removed from tank 158 in FIG. 8 and dewatered, the solids fraction being initially supplied to tank 158 from line 126 in FIG. 5, for example. Table 2 illustrates that the consolidated mature fine tailings processed according to the methods described herein show roughly an order of magnitude reduction in bitumen/solids ratio on average (0.028 vs. 0.13) after processing.

TABLE 2

Consolidated Mature Fine Tailings (after approx. 2 hrs draining)

| Date Reported | Bitumen % | Solids % | Water % | Bitumen/Solids Ratio |
|---|---|---|---|---|
| Aug. 1, 2007 | 2 | 45 | 53 | 0.044 |
| | 1 | 43 | 56 | 0.023 |
| | 3* | 31 | 66* | 0.097 |
| Aug. 3, 7, 2007 | 1 | 46 | 53 | 0.022 |
| Aug. 8, 2007 | 1 | 49 | 50 | 0.020 |
| Aug. 21, 2007 | 1 (0.2)** | 39 | 60 | 0.026 |
| | 1 (0.5)** | 45 | 54 | 0.022 |
| Sep. 5, 2007 | 1 | 47 | 52 | 0.021 |
| Oct. 16, 2007 | 2 | 46 | 52 | 0.043 |
| Nov. 2, 2007 | 1 | 52 | 47 | 0.019 |
| X | 1.2 | 43 | 53 | 0.028 |
| S | 0.4 | 7 | 4 | |
| RSD % | 37 | 16 | 7 | |

*Outlier rejected by Q test.
**Values in parentheses as provided by the analyst (but the RDL of the method is quoted as 1%).
The Oct 16 Mature Fine Tailings were not drained.

As indicated by the results of Table 2, the mineral solids (solids fraction) content increased on average from 36% in the MFT to 43% in the stacked consolidated MFT after draining for approximately 2 hours. Dean and Stark analyses of oil sands tailings samples should ideally be carried out in two stages. Even then, the analytical recovery efficiencies for processed and unprocessed samples illustrate that the methods described herein show great improvements in efficiency over prior methods.

Referring to FIG. 5, Table 3 illustrates an analysis of the composition of raw froth removed from floatation cells 42A, B, C, and D from line 120, for example. Table 3 illustrates that the raw froth shows an increase in bitumen/solids ratio of about an order of magnitude from the mature fine tailings on average (1.4 vs. 0.13) after processing. This ratio is further increased with additional processing, such as that illustrated in FIG. 6.

TABLE 3

Raw Froth

| Date Reported | Bitumen % | Solids % | Water % | Bitumen/Solids Ratio |
|---|---|---|---|---|
| Aug. 1, 2007 | 13 | 7 | 80 | 1.86 |
| Aug. 8, 2007 | 16 | 11 | 73 | 1.45 |
| Aug. 21, 2007 | 24 | 18 | 56 | 1.33 |
| Oct. 16, 2007 | 24 | 21 | 54 | 1.14 |
| Dec. 18, 2007 | 26 | 19 | 54 | 1.37 |
| | 34 | 16 | 49 | 2.12 |
| Jan. 16, 2007 | 27 | 18 | 55 | 1.50 |
| (reprocessed) | 56 | 17 | 27 | 3.29 |
| X | 23 | 16 | 60 | 1.4 |
| S | 7 | 5 | 12 | 0.3 |
| RSD % | 30 | 31 | 20 | 20 |

In the experiments tabulated in Table 3, initial dilution ranged from 1→10 to 1→3. As indicated by Tables 1 and 3, the bitumen/solids ratio increased from a mean of 0.13 in the MFT (comparable to good quality oil sand) to a mean of 1.4 in the untreated froth: a greater than ten-fold increase. It should be noted that the January 16 run was reprocessed in an additional jet pump/floatation cell treatment. Reprocessing the January 16 froth increased the bitumen/solids ratio to 3.29: an overall twenty-five fold increase. The reprocessed results of this run were not included in the statistical analysis, but are tabulated in Table 3 for an example of the effectiveness of reprocessing. The raw froth samples were not drained.

Tables 4 and 5 illustrate exemplary mass balances determined for two separate runs of the overall process illustrated in FIGS. 5 and 8. The undrained solids were taken from tank 158 (shown in FIG. 8), while the froth was taken from the floatation cells 42 from line 120 (shown in FIG. 5). Dilution refers to water introduced in the processing, while polymer solution refers to water introduced as polymer solution in the flocculation stage.

TABLE 4

Mass Balance for Run Jan. 11, 2008

| Source | Bitumen | Solids | Water | Totals |
|---|---|---|---|---|
| | Mass In (kg) | | | |
| MFT | 1.0 (25.3 × 0.04) | 9.6 (25.3 × 0.38) | 14.7 (25.3 × 0.58) | 25.3 |
| Dilution | | | 145.2 | 145.2 |
| Polymer Soln. | | | 14.9 | 14.9 |
| Totals | 1.0 | 9.6 | 174.8 | 185.4 |
| | Mass Out (kg) | | | |
| Froth | 0.9 (3.4 × 0.27) | 0.6 (3.4 × 0.18) | 1.9 (3.4 × 0.55) | 3.4 |
| Undrained Solids | 0.4* (37.5 × 0.01) | 11.1** (37.5 × 0.30) | 26.0 (37.5 × 0.69) | 37.5 |
| Water | | | 141.0 | 141.0 |
| Totals | 1.3 | 11.7 | 168.9 | 181.9 |

*Analytical results reported as RDL
**After two weeks of draining and evaporation the solids content had increased to 51%.
Δ Bitumen +30%
Δ Solids +20%
Δ Water −3%
Δ Total −2%

TABLE 5

Mass Balance for Run Jan. 23, 2008

| Source | Bitumen | Solids | Water | Totals |
|---|---|---|---|---|
| | Mass In (kg) | | | |
| MFT | 0.9 (22.5 × 0.04) | 8.8 (22.5 × 0.39) | 12.8 (22.5 × 0.57) | 22.5 |
| Dilution | | | 137.6 | 137.6 |
| Polymer Soln. | | | 11.0 | 11.0 |
| Totals | 0.9 | 8.8 | 161.4 | 171.7 |
| | Mass Out (kg) | | | |
| Froth | 0.7 (2.4 × 0.31) | 0.4 (2.4 × 0.16) | 1.3 (2.4 × 0.53) | 2.4 |
| Undrained | 0.2* | 8.1 | 14.0 | 22.6 |

TABLE 5-continued

| | | | | |
|---|---|---|---|---|
| Solids | (22.6 × 0.01) | (22.6 × 0.36) | (22.6 × 0.62) | |
| Water | | | 139 | 139 |
| Totals | 0.9 | 8.5 | 154.3 | 163.7 |

*Analytical results reported as RDL
Δ Bitumen 0%
Δ Solids −3%
Δ Water −4%
Δ Total −4%

As indicated by Tables 4 and 5 for the overall process, the total balances and the balances for water close satisfactorily. The least satisfactory is the balance for bitumen in the January 11 run. This may be partially explained by the problems associated with the Dean and Stark analysis of clay/bitumen mixtures (see St. Denis and Kessick, 1982), but perhaps more significantly that most of the bitumen values for the consolidated tailings have been reported as the lower detection limit. The poor closure for the solids fraction for the January 11 run is more puzzling, but is probably the result of sampling error, in that a partially drained sample may have been sent for analysis. Since some of the component discrepancies in the January 11 run are positive and some negative, they have tended to balance out in the overall or total mass balances. The mass balance for the January 23 run is satisfactory, closing to within 5% for all components. However, the mass balances still indicate the effectiveness of the method.

Table 6 illustrates exemplary mass balances determined for the froth cleanup step illustrated in FIG. 6. Referring to FIG. 6, raw froth was supplied from line 120 (FIG. 5) after initial processing, and the treated bitumen removed from line 88 of the final separator. Undrained solids were removed from lines 92 and 156. Water was removed from line 90.

TABLE 6

Mass balance for Froth Reprocessing (Jan. 17, 2008 Run)

| Source | Bitumen | Solids | Water | Totals |
|---|---|---|---|---|
| Mass In (kg) | | | | |
| Raw Froth | 1.30 | 0.86 | 2.64 | 4.8 |
| | (4.8 × 0.27) | (4.8 × 0.18) | (4.8 × 0.55) | |
| Dilution | | | 117.0 | 117.0 |
| Polymer Soln. | | | 2.0 | 2.0 |
| Totals | 1.3 | 0.9 | 121.6 | 123.8 |
| Mass Out (kg) | | | | |
| Reprocessed | 1.46 | 0.44 | 0.70 | 2.9 |
| Froth | (2.6 × 0.56) | (2.6 × 0.17) | (2.6 × 0.27) + 0.3 | |
| Undrained | 0.04* | 0.52 | 0.54 | 1.9 |
| Solids | (1.1 × 0.04) | (1.1 × 0.47) | (1.1 × 0.49) + 0.8 | |
| Water | | | 109.3 | 109.3 |
| Totals | 1.5 | 1.0 | 111 | 114 |

*Analytical results reported as RDL
Δ Bitumen +15%
Δ Solids +10%
Δ Water −9%
Δ Total −8%

In Table 6, illustrating the January 17 froth reprocessing run, the mass balances close poorly, probably a result of the high percentage errors associated with the sampling and analysis of the small quantities involved. However, it can be inferred that there is likely no appreciable loss of bitumen in the procedure.

Although a mass balance for the froth dilution/centrifugation step has yet to be completed, preliminary results indicate a 92% recovery of 0.05% BS&W (basic water and sediment) dilbit with an approximately 8% dilbit loss to the centrifuge underflow.

Work to date illustrates that not only is remediation of the tailings ponds possible, but that it is economically feasible due to the direct value of the recovered residual bitumen. The data indicate that greater than 90% recovery of the bitumen is possible in both the initial removal and the reprocessing and cleaning steps.

Finally, the consolidated, cleaned mature fine tailings may be amenable to overburden replacement and revegetation. This results in restoration of the entire tailings disposal area, not just the sand dykes, as wildlife habitat.

Immaterial modifications may be made to the embodiments described here without departing from what is covered by the claims.

The embodiments of the invention in which an exclusive property or privilege is claimed are defined as follows:

1. A method of separating hydrocarbons from a mixture comprising a solids fraction, water, and a hydrocarbon fraction, the method comprising:
   supplying at least a portion of the mixture as a primary flow to a jet pump;
   supplying a flow of gas to a mixing chamber of the jet pump; and
   operating the jet pump using the at least a portion of the mixture and the flow of gas to produce an agitated mixture and supplying the agitated mixture into at least one separator to create effervescence to effect at least a partial separation of the hydrocarbon fraction from the solids fraction.

2. The method of claim 1 in which the primary flow comprises less than 20% solids by mass.

3. The method of claim 2 in which the primary flow comprises more than 10% tailings by volume.

4. The method of claim 1 in which the mixture comprises tailings from at least a first tailings pond.

5. The method of claim 4, further comprising:
   separating at least a portion of the water from the hydrocarbon fraction and solids fraction; and
   returning the at least a portion of the water to a second tailings pond different from the first tailings pond.

6. The method of claim 4, further comprising:
   separating at least a portion of the water from the hydrocarbon fraction and the solids fraction; and
   returning the at least a portion of the water to the first tailings pond.

7. The method of claim 4, further comprising:
   separating at least a portion of the solids fraction from the hydrocarbon fraction and the water; and
   returning the at least a portion of the solids fraction to a second tailings pond different from the first tailings pond.

8. The method of claim 4, further comprising:
   separating at least a portion of the solids fraction from the hydrocarbon fraction and the water; and
   returning the at least a portion of the solids fraction to the first tailings pond.

9. The method of claim 4, further comprising diluting a first stream supplied from the first tailings pond with a second stream to provide the at least a portion of the mixture that is supplied as a primary flow to the jet pump.

10. The method of claim 9 in which:
the first stream has a first density;
the second stream is supplied from one or both of the first tailings pond and a second tailings pond and has a second density; and
the second density is lower than the first density.

11. The method of claim 9 in which:
the first stream has a first liquid content;
the second stream has a second liquid content; and
the second liquid content is higher than the first liquid content.

12. The method of claim 11 in which the second liquid content is predominantly water.

13. The method of claim 9 in which diluting the first stream with the second stream is carried out in one or both of a jet pump and a flash mixer.

14. The method of claim 9 in which:
the first stream is supplied from a first vertical level from the first tailings pond;
the second stream is supplied from a second vertical level from the first tailings pond; and
the second vertical level is higher than the first vertical level.

15. The method of claim 9 in which the second stream comprises a non polar solvent diluent.

16. The method of claim 15 in which the first stream is diluted with at least 1.5 mL diluent per kilogram of first stream.

17. The method of claim 15 in which the mixture is diluted with less than or equal to 10% by weight of the hydrocarbon fraction.

18. The method of claim 9 in which the first stream comprises more solids by mass than the second stream.

19. The method of claim 9 in which the first stream is a slurry.

20. The method of claim 9 in which the first stream comprises between 20% and 50% solids by mass.

21. The method of claim 9 in which the second stream comprises light mature fine tailings.

22. The method of claim 4 in which the tailings comprise mature fine tailings.

23. The method of claim 22 in which the tailings comprise heavy mature fine tailings.

24. The method of claim 1 in which the gas comprises air.

25. The method of claim 1, wherein supplying a flow of gas comprises causing the jet pump to draw gas into the mixing chamber.

26. The method of claim 1, in which operating further comprises controlling the flow of gas.

27. The method of claim 26 in which the volume of supplied gas and the volume of mixture is substantially equal.

28. The method of claim 1, further comprising separating at least a portion of the hydrocarbon fraction from the agitated mixture in the at least one separator.

29. The method of claim 28, further comprising:
supplying the at least a portion of the hydrocarbon fraction into a second jet pump;
supplying a flow of gas to a mixing chamber of the second jet pump; and
operating the second jet pump using the hydrocarbon fraction and the flow of gas to agitate the hydrocarbon fraction and supply an agitated hydrocarbon fraction from the second jet pump into a second separator to effect at least a partial phase separation of the hydrocarbon fraction from the solids fraction.

30. The method of claim 29 in which the hydrocarbon fraction is supplied into the second jet pump at above ambient temperature.

31. The method of claim 30 in which the hydrocarbon fraction is supplied into the second jet pump at above 60 degrees Celsius.

32. The method of claim 28 in which separating further comprises removing the at least a portion of the hydrocarbon fraction from an upper portion of a settling tank.

33. The method of claim 32 in which removing the at least a portion of the hydrocarbon fraction comprises removing a hydrocarbon froth.

34. The method of claim 28 in which the at least one separator comprises a centrifuge.

35. The method of claim 1, further comprising separating at least a portion of the solids fraction from the agitated mixture in the at least one separator.

36. The method of claim 35 in which separating the at least a portion of the solids fraction further comprises removing the at least a portion of the solids fraction from a bottom portion of a settling tank.

37. The method of claim 35, further comprising flocculating the at least a portion of the solids fraction to give flocculated solids.

38. The method of claim 37, further comprising dewatering the flocculated solids.

39. The method of claim 37, wherein flocculating the at least a portion of the solids fraction comprises adding a flocculant.

40. The method of claim 39, wherein the flocculant comprises an anionic long chain polymer.

41. The method of claim 1, further comprising supplying at least a portion of at least one of the solids fraction, the water, and the hydrocarbon fraction from the at least one separator to a mixing chamber of an auxiliary jet pump for additional separation.

42. The method of claim 1, further comprising:
supplying at least a portion of the agitated mixture as a primary flow into a second jet pump;
supplying a flow of gas to a mixing chamber of the second jet pump; and
operating the second jet pump using the at least a portion of the agitated mixture and the flow of gas to agitate the at least a portion of the agitated mixture and supply a further agitated mixture from the second jet pump into a second separator to effect at least a partial phase separation of the hydrocarbon fraction from the solids fraction.

43. The method of claim 42 in which the at least a portion of the agitated mixture comprises at least a portion of at least one of the hydrocarbon fraction, the water, and the solids fraction.

44. The method of claim 1, further comprising discharging the agitated mixture from the jet pump into a discharge line with a length to inner diameter ratio between 30:1 to 50:1.

45. The method of claim 1 in which the flow of gas is from a source distinct from the mixture and the primary flow.

* * * * *